(12) United States Patent
Honda et al.

(10) Patent No.: US 6,265,789 B1
(45) Date of Patent: Jul. 24, 2001

(54) ELECTRONIC APPARATUS

(75) Inventors: Katsuyuki Honda, Shioiiri; Motomu Hayakawa, Shiojiri; Ichiro Aoshima, Shimosuwa-machi; Hidetoshi Matsuki, Sendai, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/341,933

(22) PCT Filed: Nov. 19, 1998

(86) PCT No.: PCT/JP98/05221

§ 371 Date: Sep. 10, 1999

§ 102(e) Date: Sep. 10, 1999

(87) PCT Pub. No.: WO99/27603

PCT Pub. Date: Jun. 3, 1999

(30) Foreign Application Priority Data

Nov. 20, 1997 (JP) .................................................. 9-319723
Mar. 31, 1998 (JP) ................................................. 10-085774

(51) Int. Cl.[7] .................................................. H01M 10/46

(52) U.S. Cl. .............................................. 307/33; 307/106

(58) Field of Search ....................................... 307/104, 33

(56) References Cited

U.S. PATENT DOCUMENTS

| 5,070,293 | * | 12/1991 | Ishii et al. ................................. 320/2 |
| 5,455,467 | * | 10/1995 | Young et al. ........................ 307/104 |
| 5,550,452 | * | 8/1996 | Shirai et al. ............................. 320/2 |
| 5,920,131 | * | 7/1999 | Platt et al. ........................... 307/104 |
| 5,923,544 | * | 7/1999 | Urano .................................. 307/104 |
| 5,929,598 | * | 7/1999 | Nakama et al. ..................... 320/108 |
| 5,949,155 | * | 9/1999 | Tamura et al. ....................... 307/107 |

FOREIGN PATENT DOCUMENTS

| 60-8636 | 1/1985 | (JP) . |
| 6-24356 | 3/1994 | (JP) . |
| 8-79976 | 3/1996 | (JP) . |
| 9-330838 | 12/1997 | (JP) . |

* cited by examiner

*Primary Examiner*—Fritz Fleming

(57) ABSTRACT

In at least two separated devices, a data transmission or a power transmission is performed through the electromagnetic coupling of coils which are arranged in mutually facing positions in the respective devices. In order to reduce the effect of a displacement between two coils even if the two coils are displaced from each other, the inner diameter of a coil 110 on the side of a station, as a primary coil, for performing the data transmission or the power transmission, is set to be larger than the inner diameter of a coil 210 on a watch side, as a secondary coil, by at least 1 mm.

17 Claims, 16 Drawing Sheets

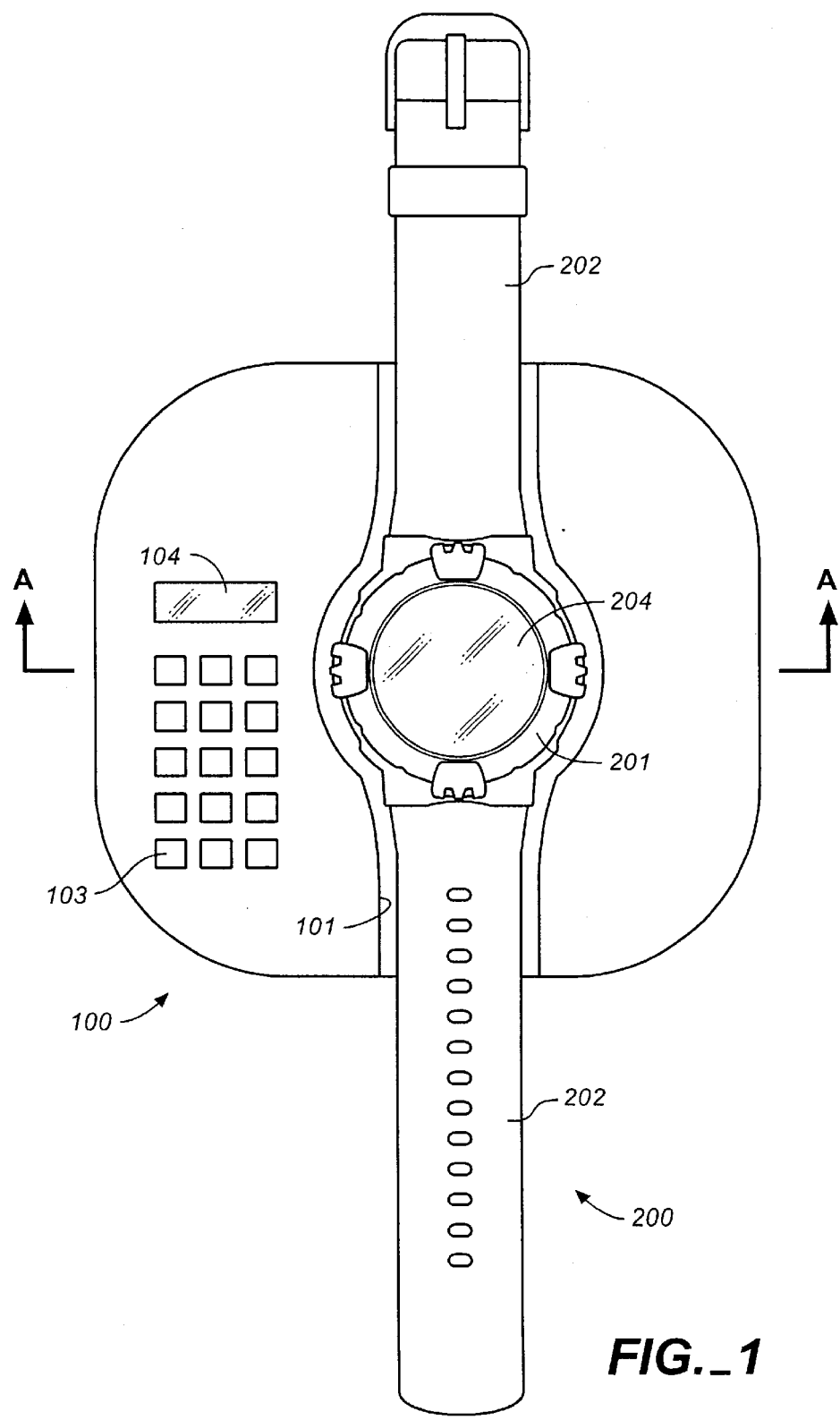
FIG._1

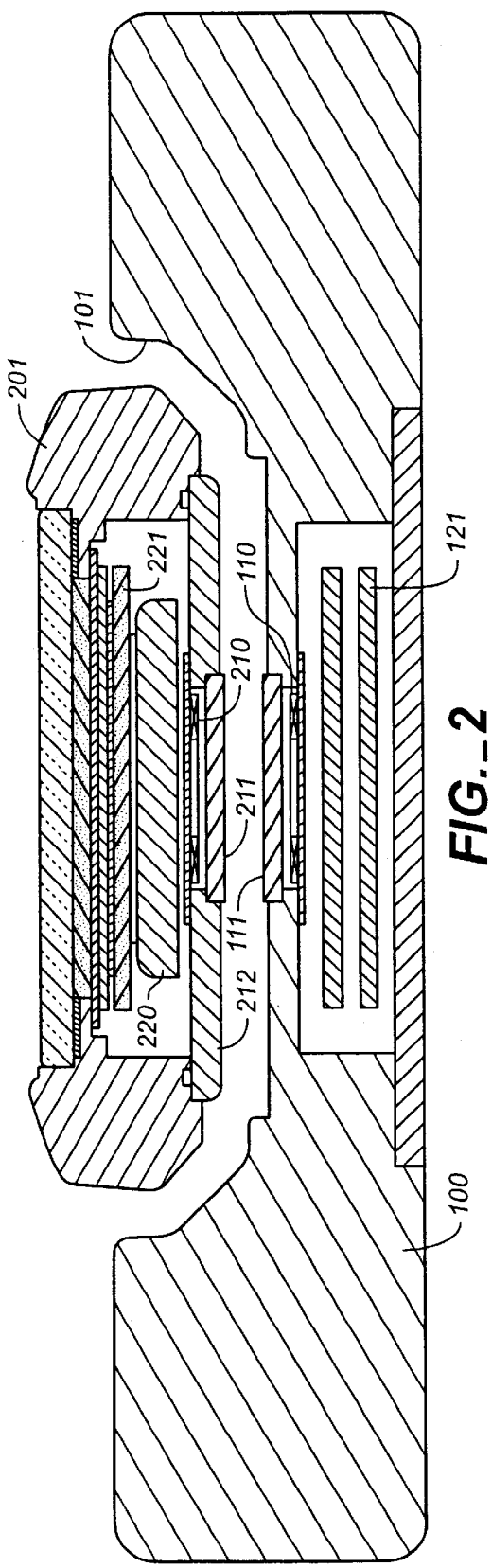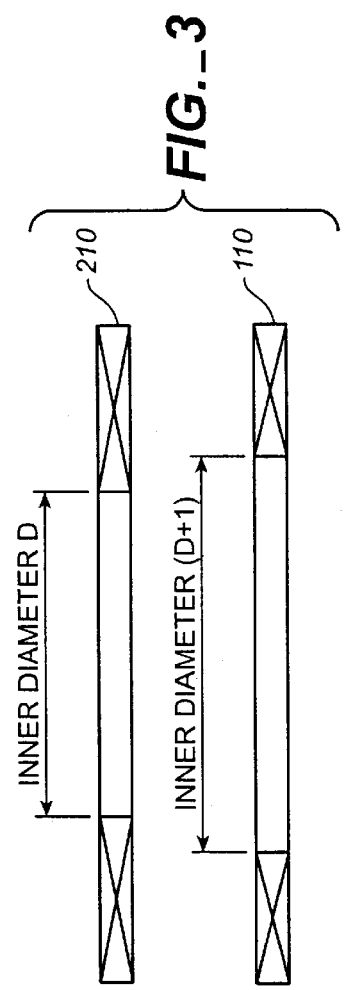

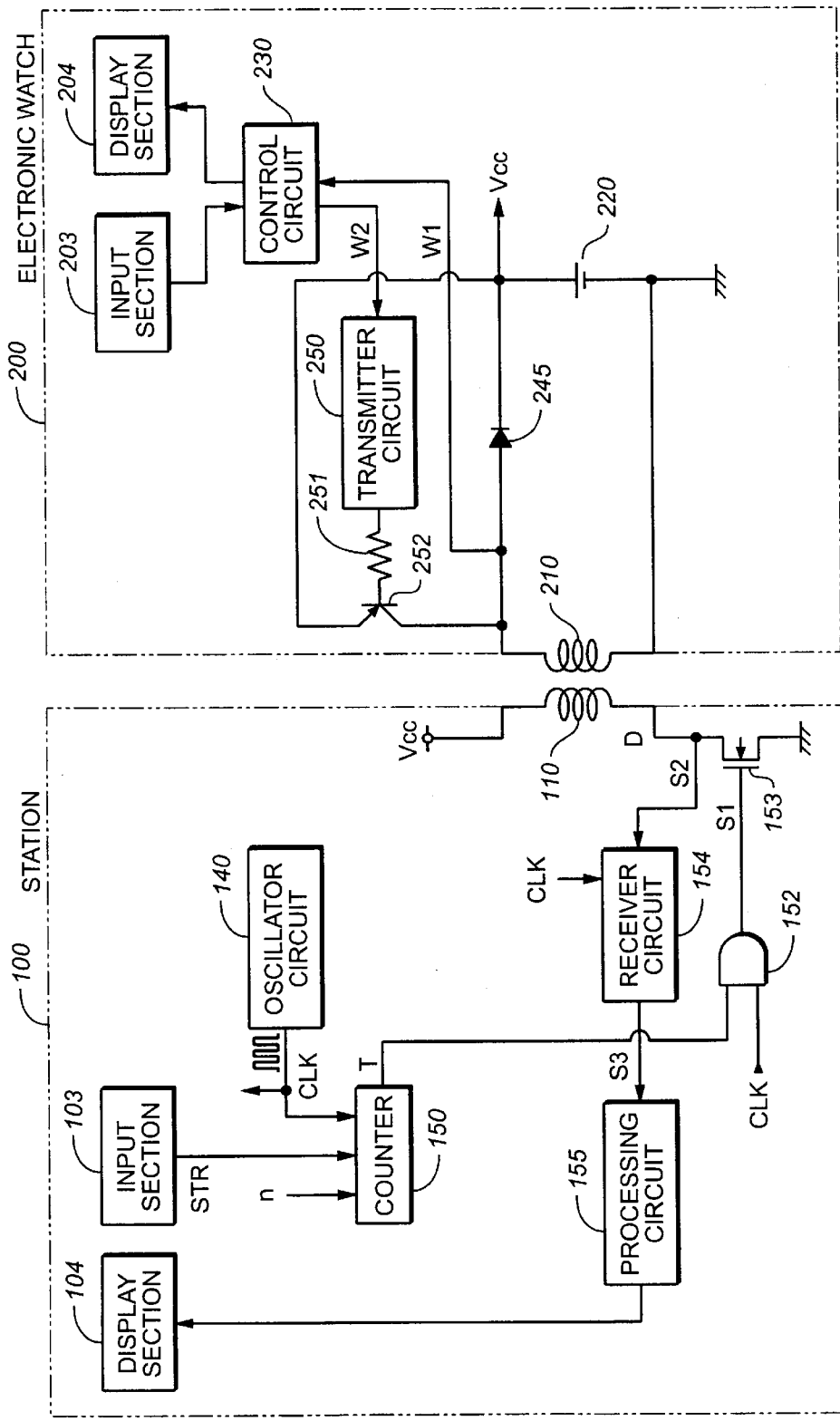
FIG._4

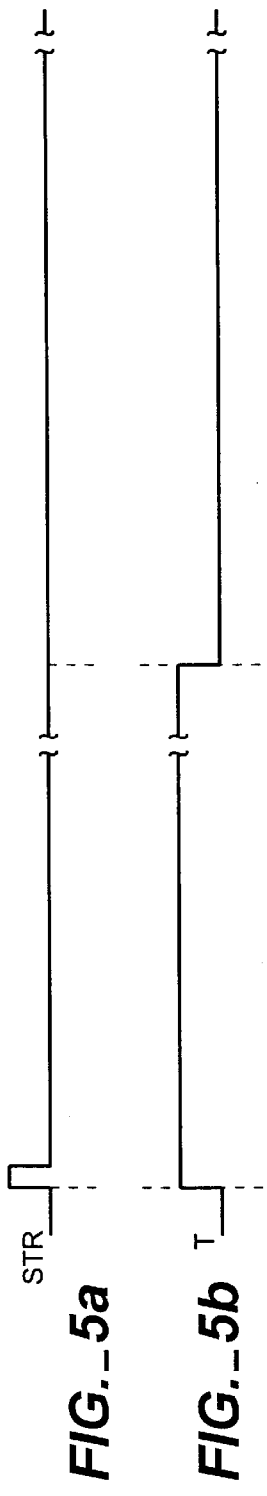
FIG._5a STR
FIG._5b T
FIG._5c SWITCHING WAVEFORM ON PRIMARY SIDE
FIG._5d DATA TO BE SENT TO PRIMARY SIDE
FIG._5e SWITCHING WAVEFORM ON SECONDARY SIDE
FIG._5f S3
t1 — CHARGING PERIOD — t2 — DATA TRANSMISSION TIME

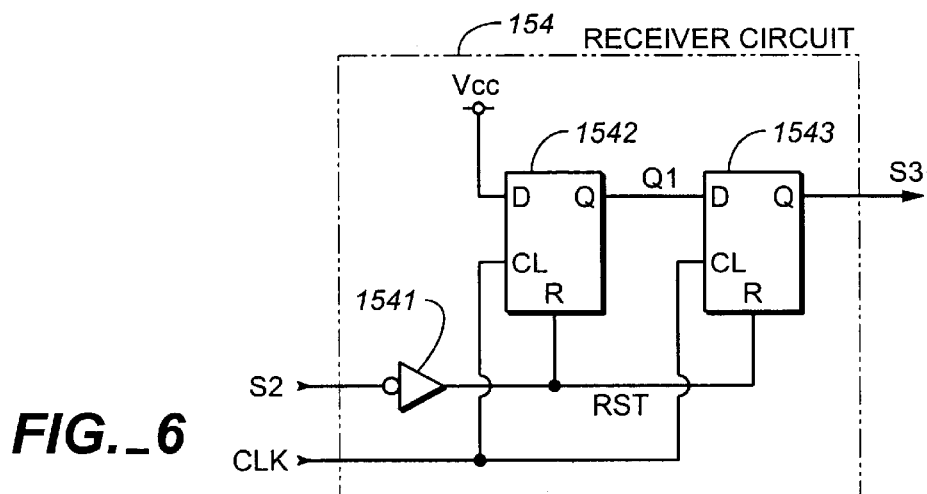
FIG._6
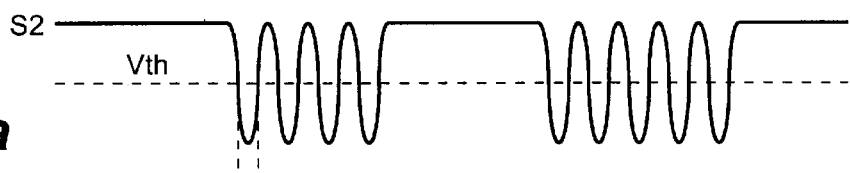
FIG._7a
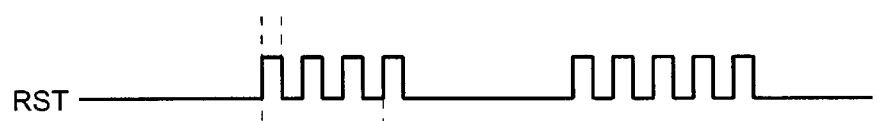
FIG._7b
FIG._7c
FIG._7d
FIG._7e

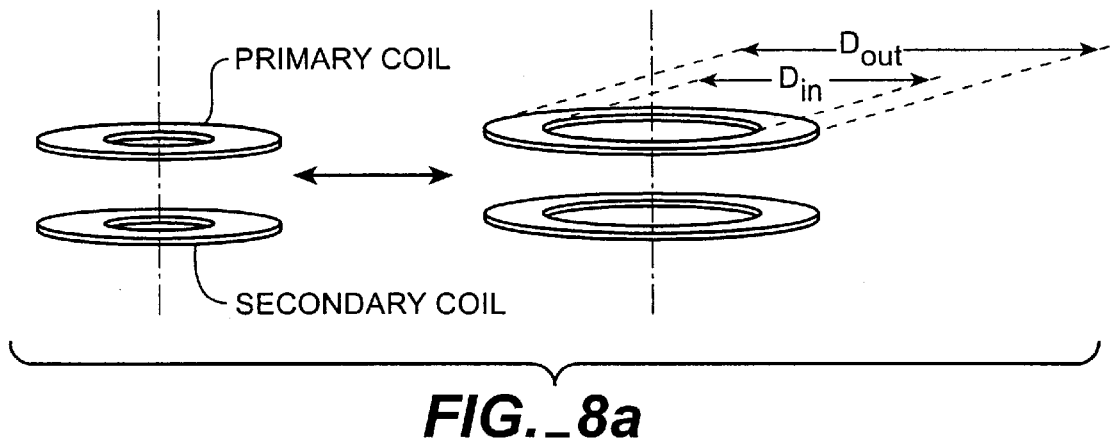
FIG._8a
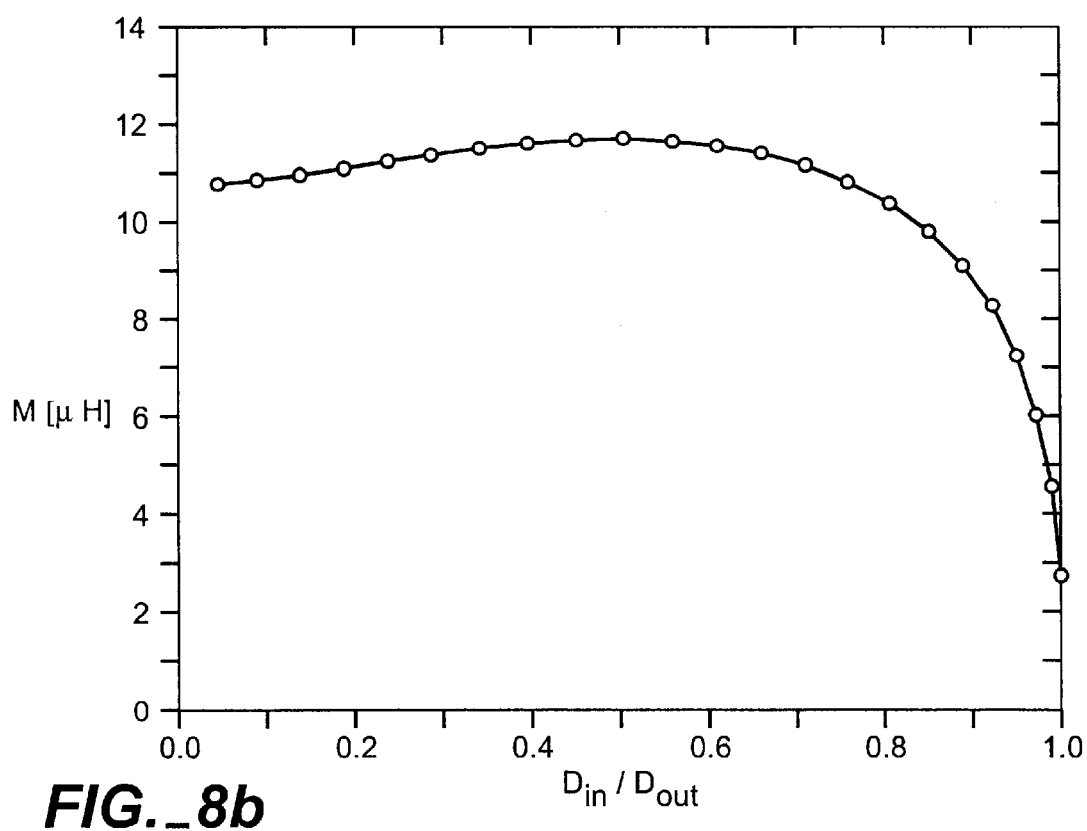
FIG._8b

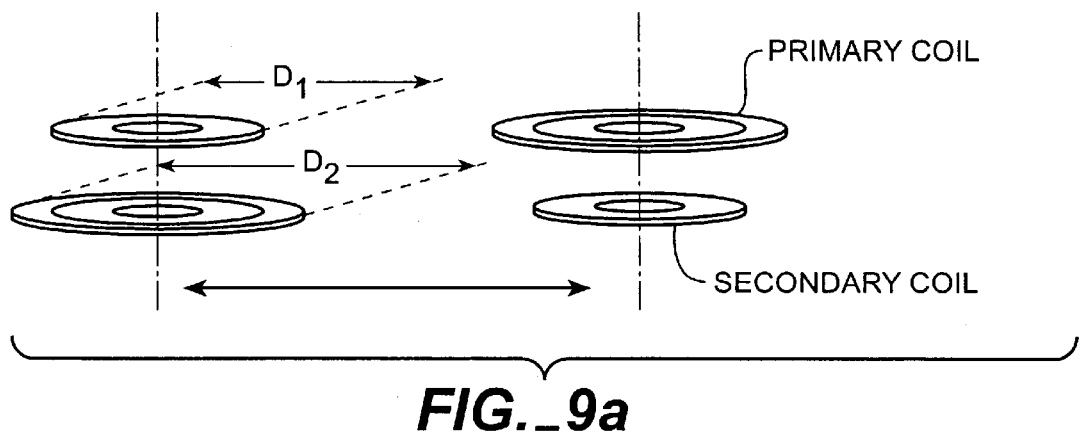
FIG._9a
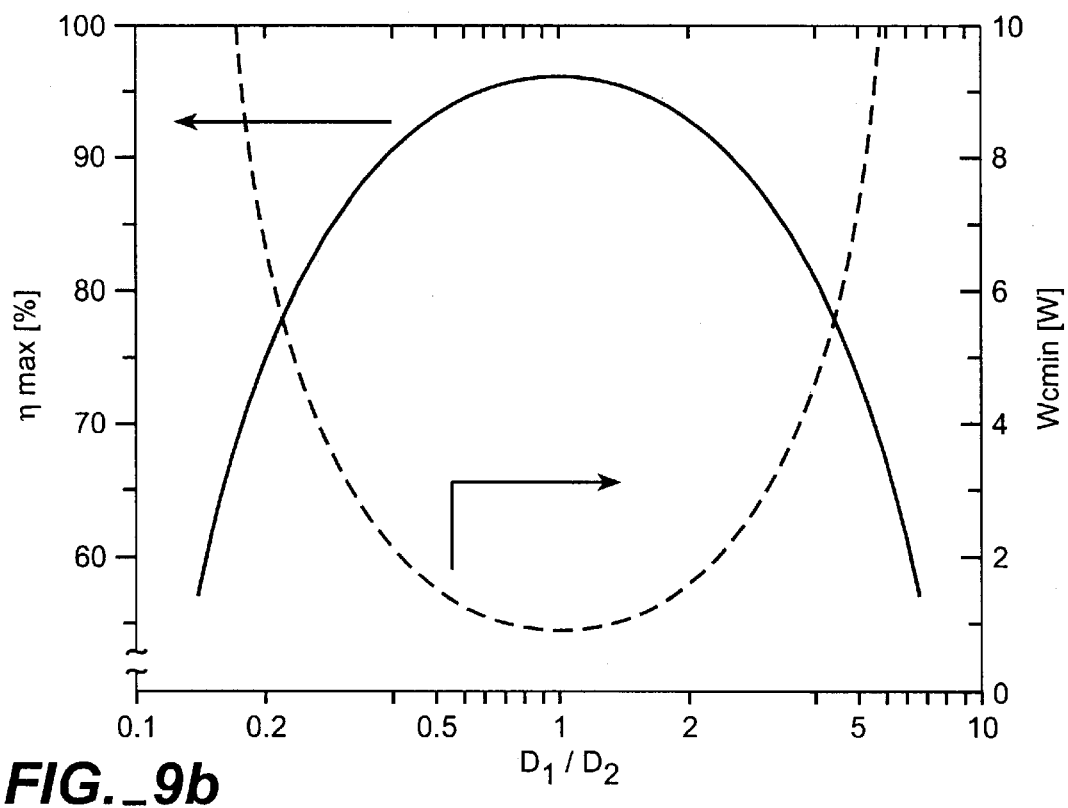
FIG._9b

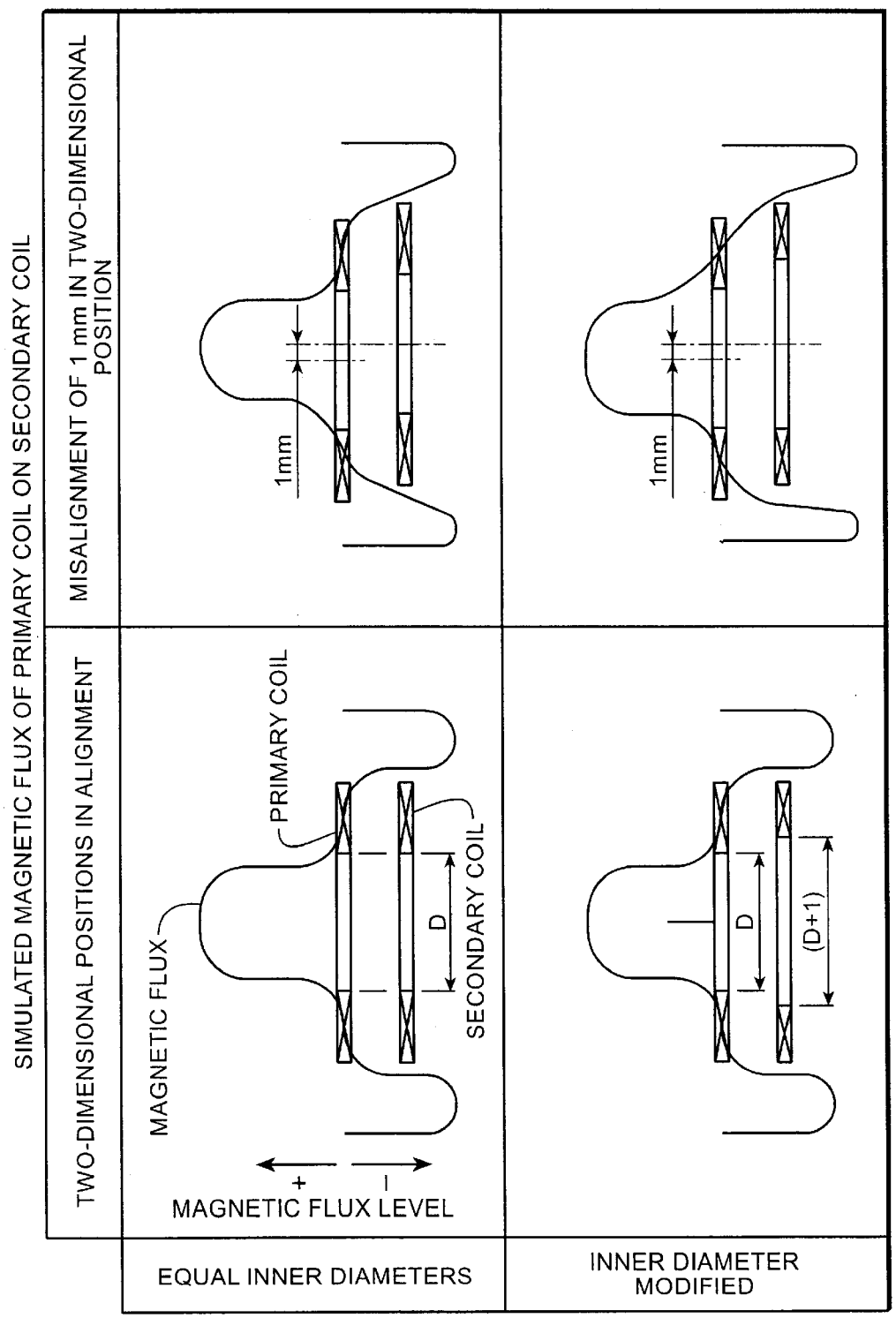
FIG._10

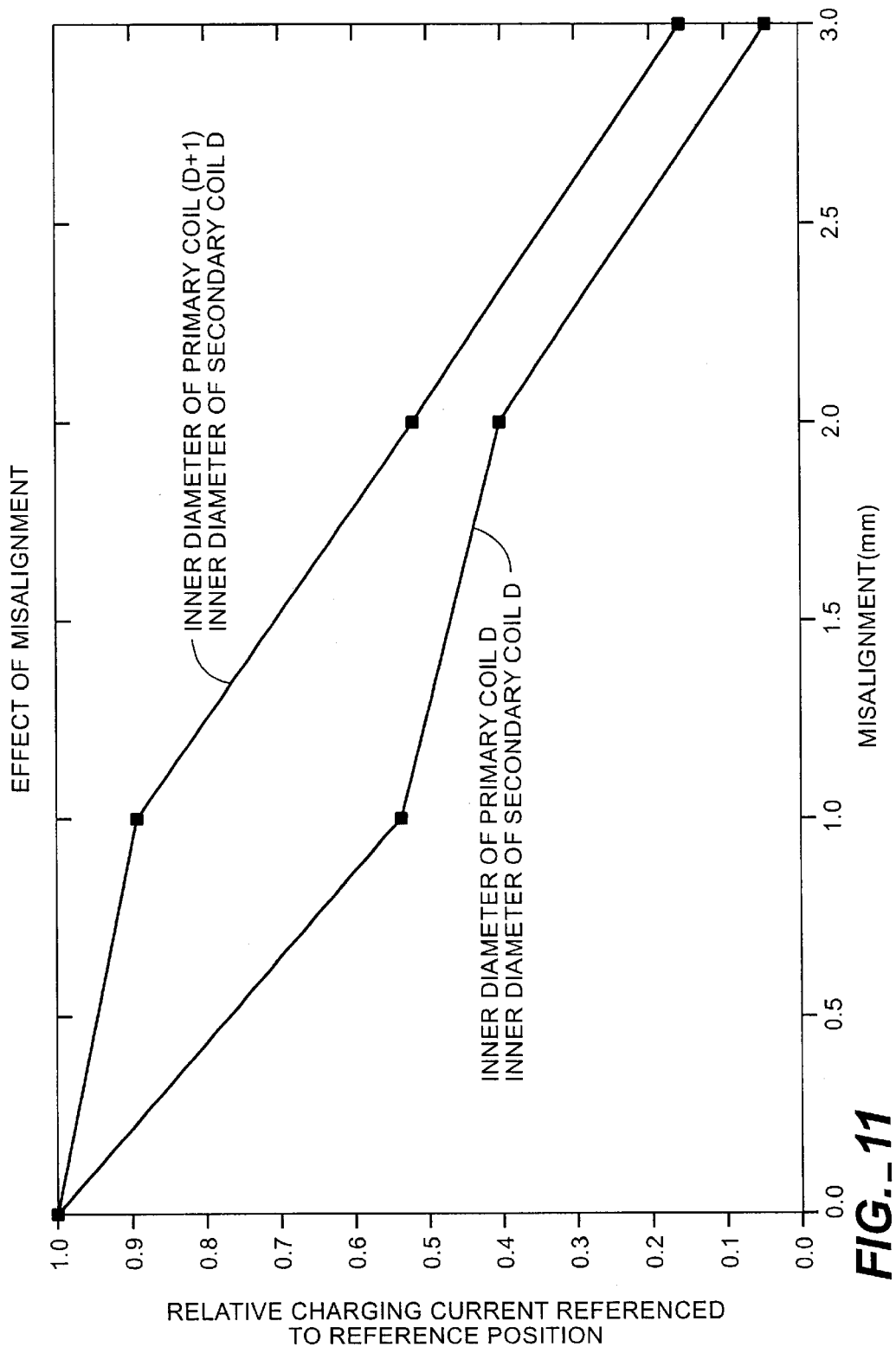
FIG._11

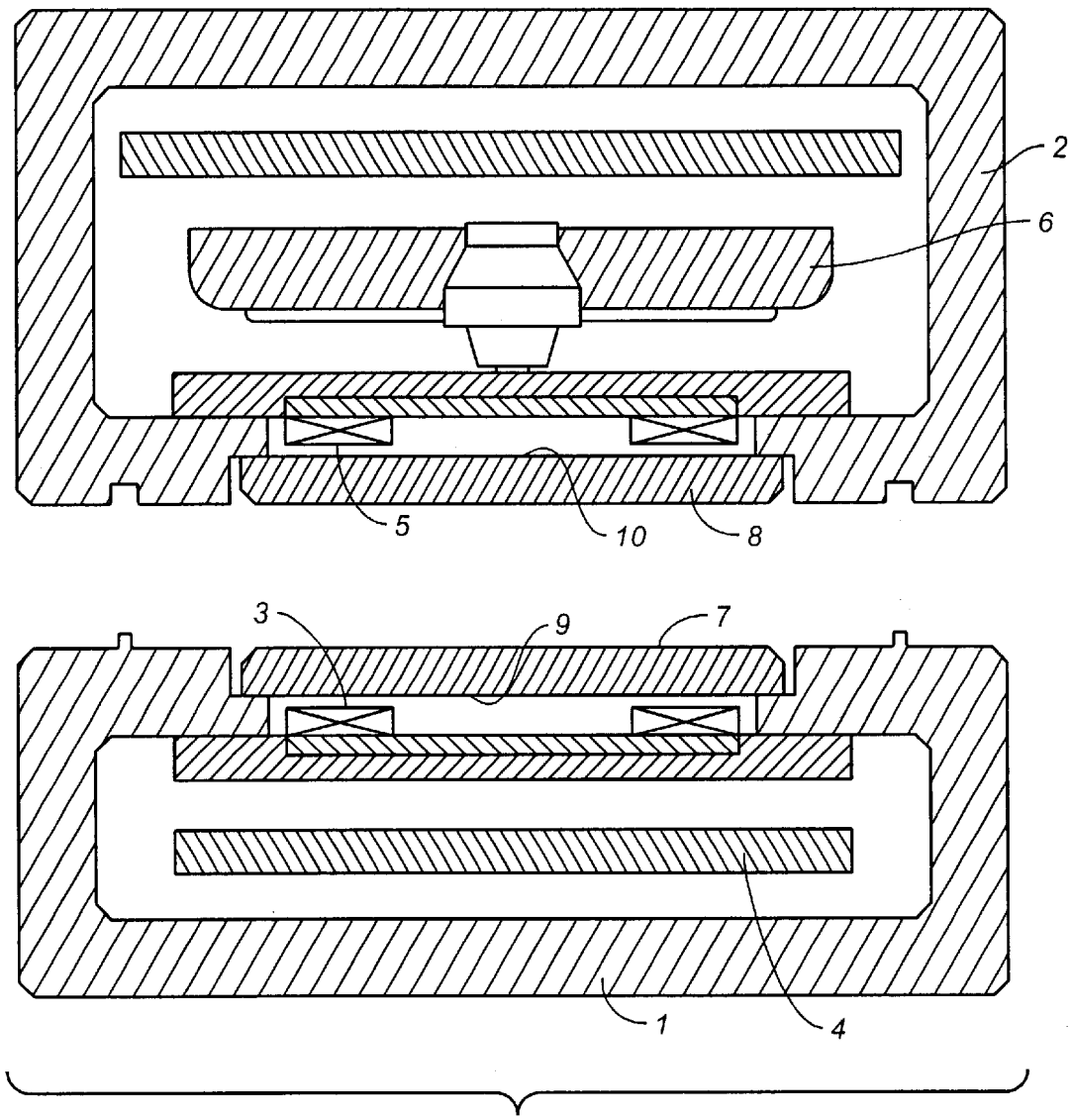
FIG._12

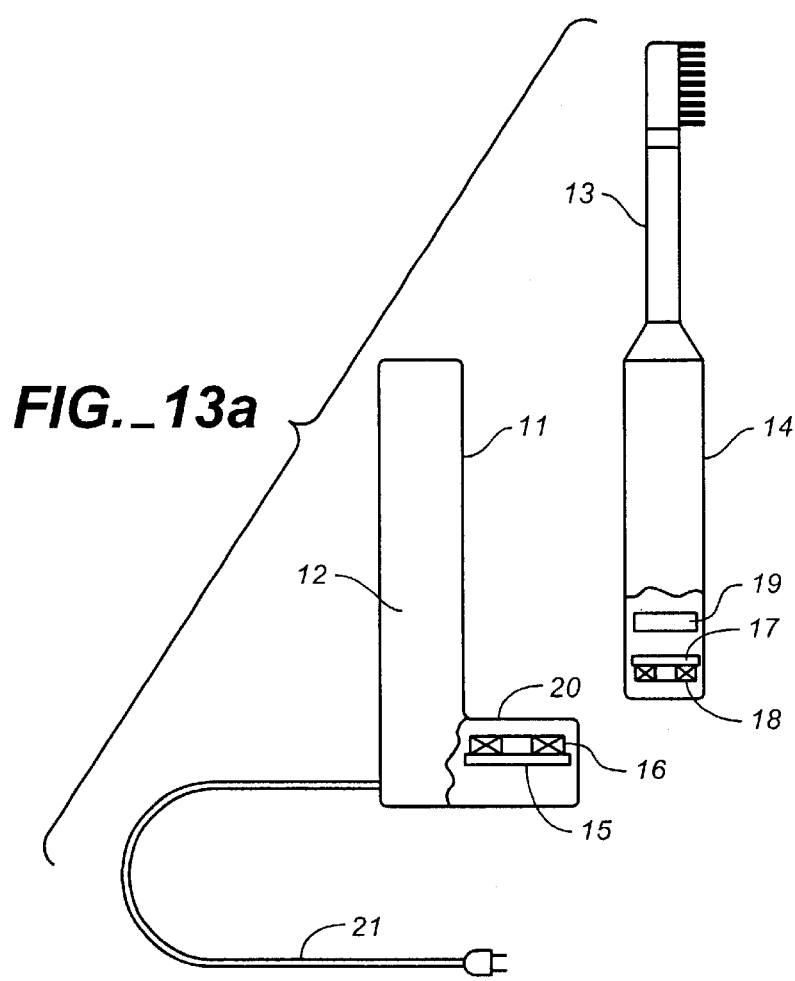
FIG._13a
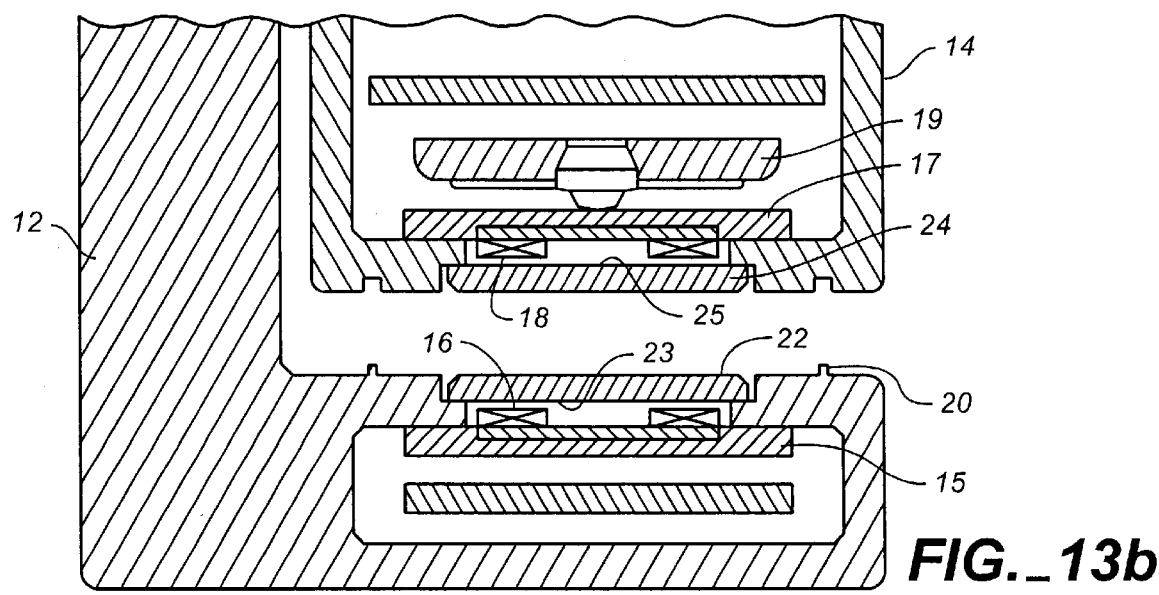
FIG._13b

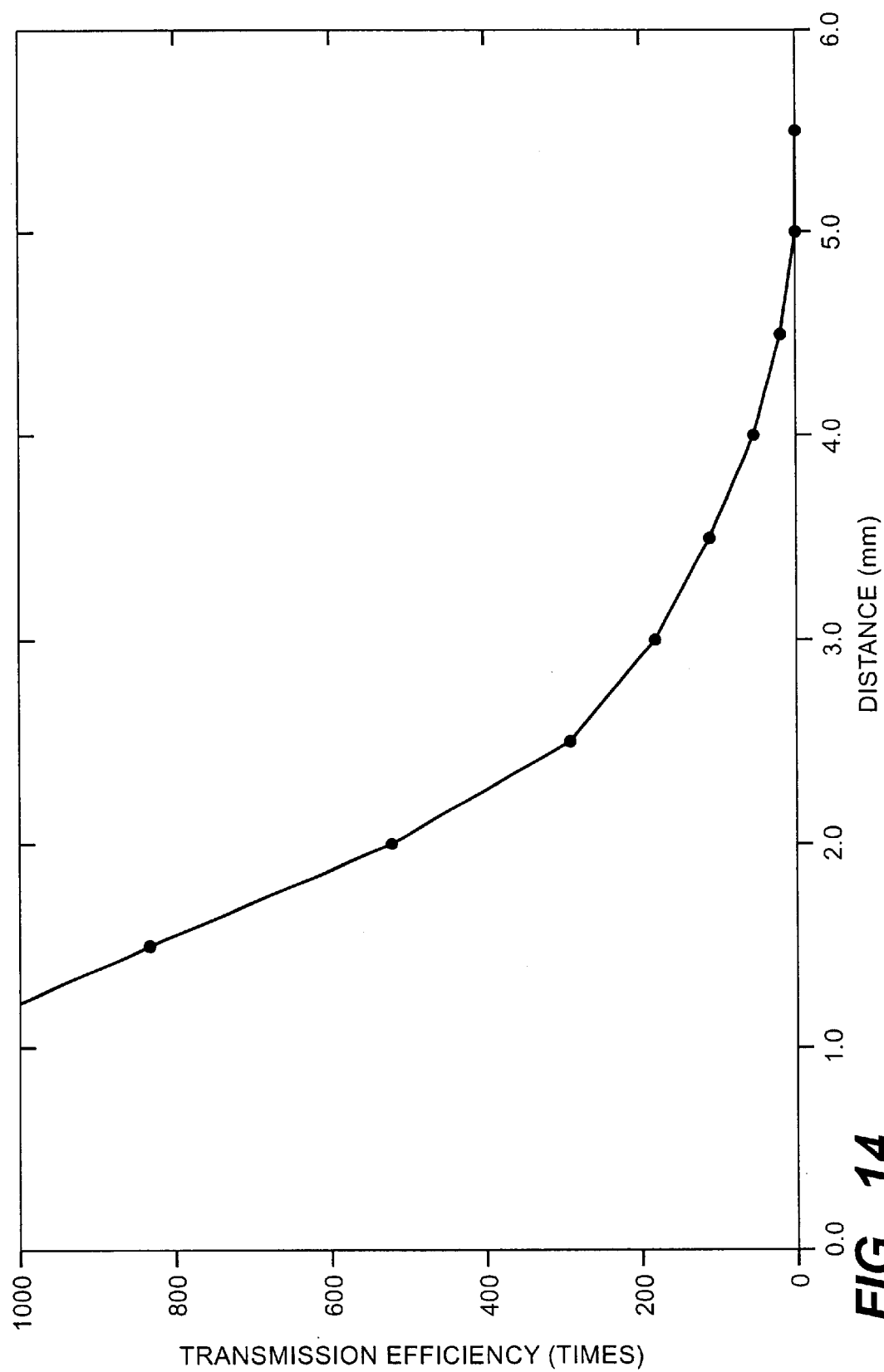
FIG._14

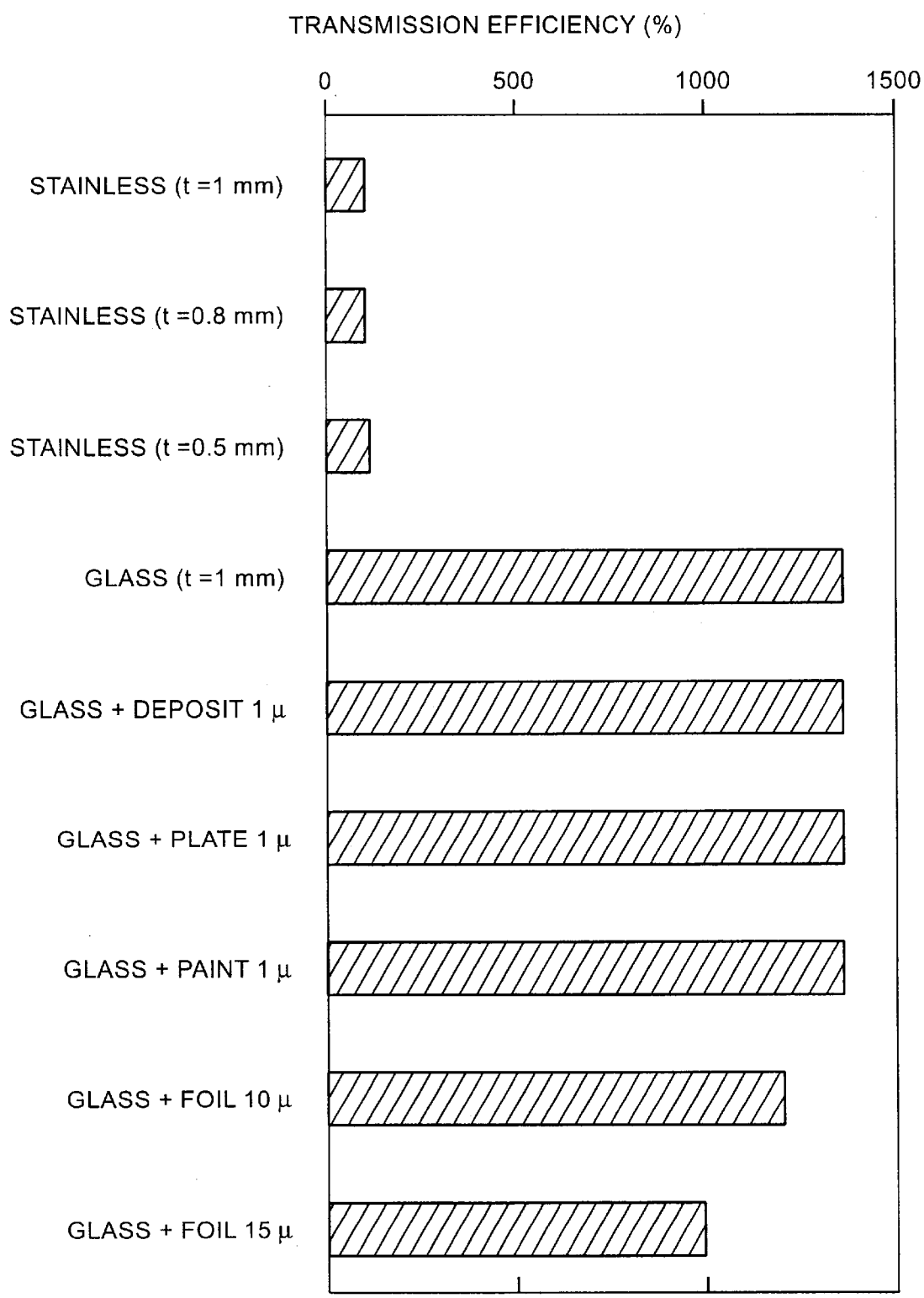
FIG._15

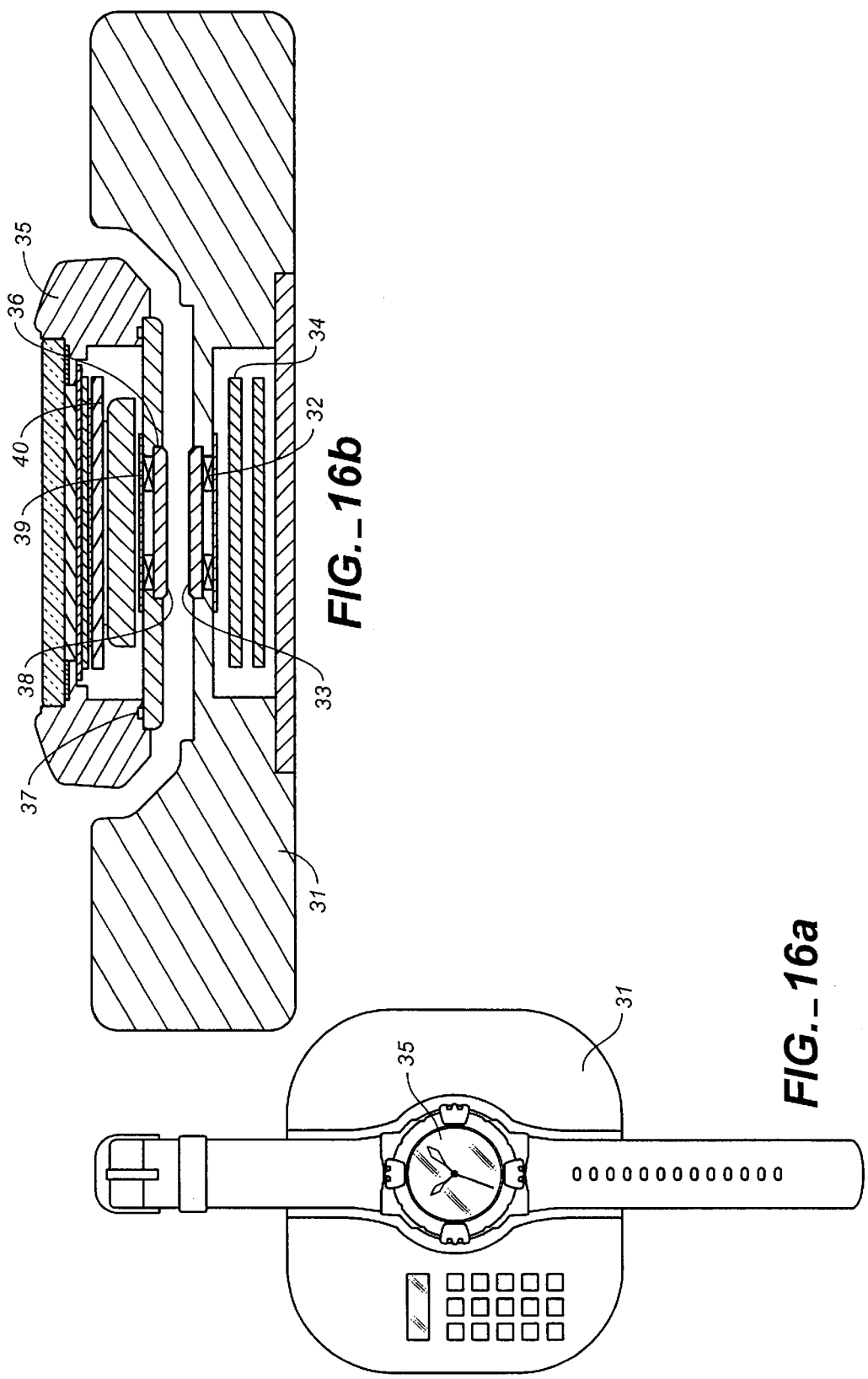

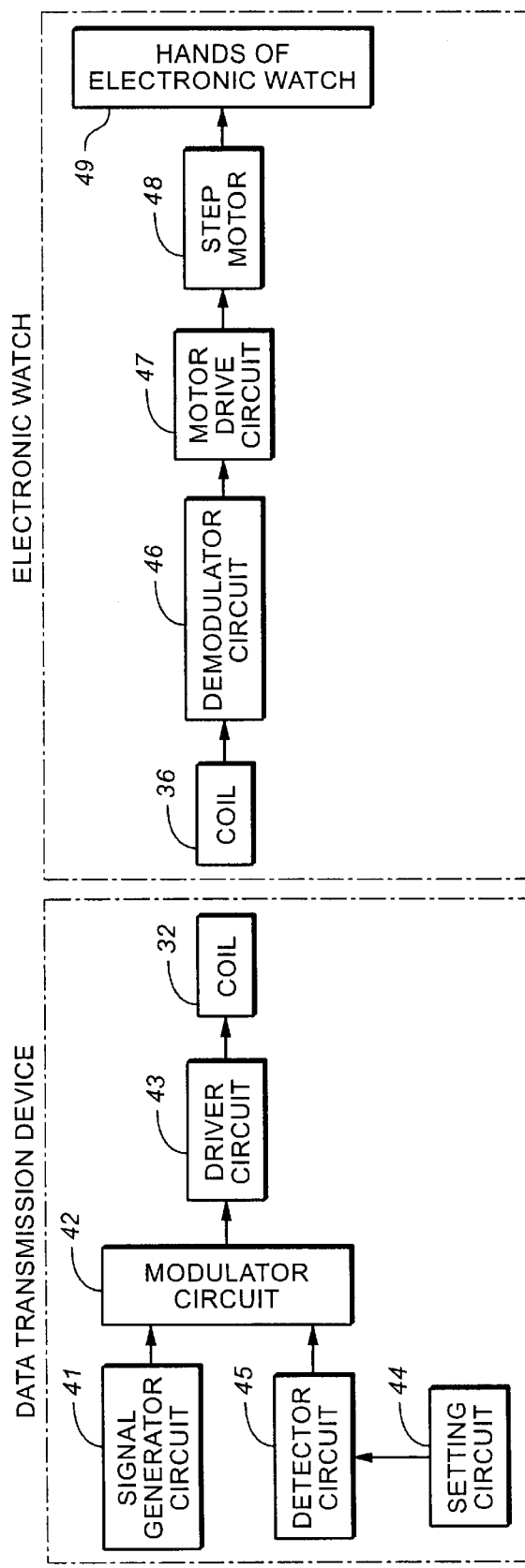
FIG._16c

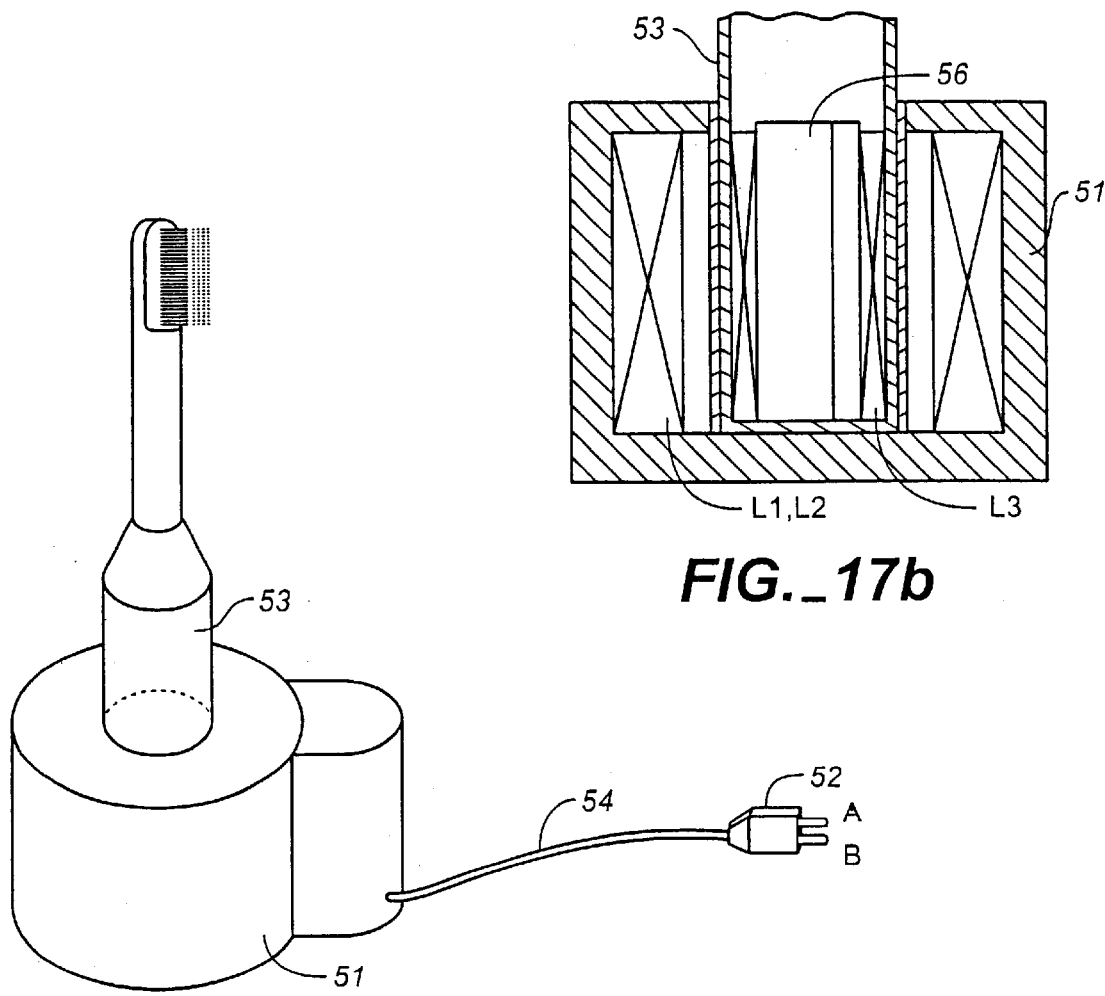
FIG._17b
FIG._17a
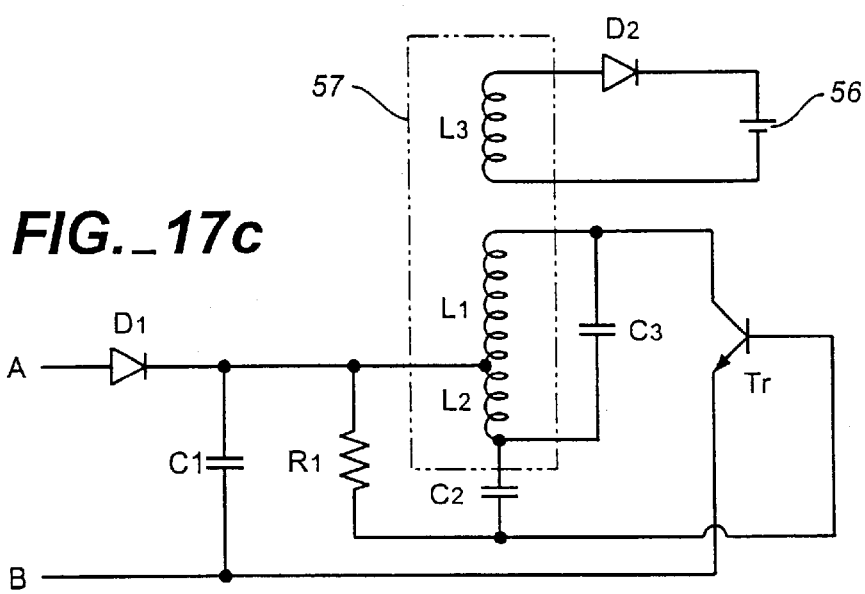
FIG._17c

ELECTRONIC APPARATUS

TECHNICAL FIELD

The present invention relates to an electronic apparatus in which one of two devices charges the other in a non-contact fashion, and to an electronic apparatus in which a one-way or two-way data transmission is possible between two devices, and, more particularly, to an electronic apparatus including one device, operated from a rechargeable secondary battery, such as a motorized tooth brush, a motorized shaver, a cordless telephone, a portable telephone, a PHS (Personal Handy-phone System: a simplified portable telephone system), a mobile personal computer, a compact information device, an electronic watch or the like, and the other device for charging the first device in a non-contact fashion.

BACKGROUND ART

It is becoming an accepted practice that a compact portable electronic apparatus, such as a portable terminal or an electronic watch, is put into a charging device called a station for charging with a signal transmission performed on the portable electronic apparatus at the same time. If the charging and the signal transmission are performed through electrical contacts in such a system, the contacts are exposed and the apparatus is weak in terms of waterproofness. For this reason, the charging and the signal transmission are preferably performed in a non-contact fashion, through the electromagnetic coupling between coils respectively arranged in the station and the portable electronic apparatus.

If a high-frequency signal is applied to the coil on the station in such a system, an external magnetic field takes place, inducing a voltage in the coil on the portable electronic apparatus side. By rectifying the induced voltage through a diode or the like, a secondary battery arranged in the portable electronic apparatus can be charged in a non-contact fashion. Through the electromagnetic coupling between the two coils, a signal can be transmitted in a two-way communication in a non-contact fashion from the station to the portable electronic apparatus or from the portable electronic apparatus to the station.

In the coil on the station side and the coil on the portable electronic apparatus side, not only the electromagnetic coupling is required to be assured but also the efficiencies in the battery charging and signal transmission are required to be enhanced.

In the conventional art, the surfaces of coil winding of the two coils are in parallel with their centers in alignment with each other when the portable electronic apparatus is placed into the station.

Placing the two coils into alignment by simply seating the portable electronic apparatus into the station is difficult because the positions of the coils attached in the station and the portable electronic apparatus are required to be accurate. There is a need for an arrangement which is intrinsically less affected from a modest degree of displacement between the two coils.

An apparatus shown in FIG. 17, as another background art, is now discussed. The apparatus includes a rechargeable secondary battery and an electronic device having a charging unit for performing a charging operation in a non-contact fashion, and is disclosed in Japanese Unexamined Utility Model Publication No. 60-8636, for example.

Referring to FIG. 17, there are shown a stand 51, a power plug 52, a handle 53 of a tooth brush, a power cord 54, a secondary battery 56, primary coils L1, L2, a secondary coil L3, diodes D1, D2, a transistor Tr, capacitors C1, C2, and C3, and a resistor R1. The electronic apparatus here is a tooth brush, in which a charging unit is installed in the stand 51, and a charged unit is installed in the handle 53. The stand 51 includes a high-frequency oscillator (self-oscillation circuit) composed of the primary coils L1 and L2 of a transformer, the transistor Tr, the resistor R1, and the capacitors C2 and C3, and emits outwardly an electromagnetic field from the high-frequency oscillator circuit.

The charged unit in the handle 53 of the tooth brush includes the secondary coil L3 of the transformer which is electromagnetically coupled with the primary coils L1 and L2 in the charging unit to induce a voltage therein, and further includes the rectifying diode D2 and the secondary battery (Ni-Cd battery) 56.

A user picks up the motorized tooth brush from the stand 51 by gripping the handle 53 of the tooth brush to use it, and when it is not used, the tooth brush is stored in its upright position in the stand 51.

Since the primary coils L1 and L2 in the charging unit are electromagnetically coupled with the secondary coil L3 in the charged unit in the storage state of the brush, a voltage is induced in the secondary coil L3 in the charged unit. The induced voltage charges the secondary battery 56 through the diode D2.

The electronic apparatus shown in FIG. 17 suffers from the following problems.

Since the motorized tooth brush is typically exposed to water, the stand 51 and the handle 53 of the tooth brush are waterproof-structured with gaskets so that internal circuits are not wetted with water. To maintain the waterproof structure against the pressure of tap water from a faucet, the members of the tooth brush need to have a sufficient strength not to deform under the water pressure. The outer resin portion of the handle 53 of the tooth brush needs a minimum of thickness, and the resin portion forming the housing of the stand 51 needs a minimum of thickness. For this reason, the gap between the primary and the secondary coils is increased, and the degree of magnetic coupling weakens, substantially reducing the charging current to the secondary battery for charging. The quick charging of the secondary battery cannot be made in a short period of time. If the handle 53 of the tooth brush or the housing of the stand 51 is constructed of a metal having a high rigidity, such as stainless steel, the gap between the primary and secondary coils can be reduced. In this case, however, eddy currents take place in the electrically conductive metal material, weakening the electromagnetic coupling. As a result, the quick charging of the secondary battery cannot be performed in a short period of time.

DISCLOSURE OF THE INVENTION

The present invention has been developed in view of the above problem, and the major objectives of the present invention are as follows. A first object is to enable a quick charge of a secondary battery to be performed by improving the efficiency of a power transmission from a charging unit to a charged unit in a non-contact charge.

A second object of the present invention is to enable a high S/N ratio, highly reliable data transmission to be performed by improving the efficiency of a data transmission from a data transmitting unit to a data receiving unit in a non-contact data transmission device.

To achieve the first and second objects, an electronic apparatus of the present invention includes a first device and a second device, which perform a power transmission or a signal transmission through the electromagnetic coupling of coils which are arranged in mutually facing positions in the respective devices, wherein one of the inner diameter of a first coil arranged in the first device and the inner diameter of a second coil arranged in the second device is larger than the other of the inner diameter of the first coil and the inner diameter of the second coil by at least 1 mm.

In another arrangement of the present invention, an electronic apparatus includes a first device and a second device, which perform a power transmission or a signal transmission through the electromagnetic coupling of coils which are arranged in mutually facing positions in the respective devices, wherein each of the ratios of (the inner diameter)/(the outer diameter) of the first coil and the second coil is equal to or greater than 0.3, and equal to or smaller than 0.7, and wherein one of the inner diameter of the first coil arranged in the first device and the inner diameter of the second coil arranged in the second device is larger than the other of the inner diameter of the first coil and the inner diameter of the second coil by at least 1 mm.

In yet another arrangement of the present invention, an electronic apparatus includes a first device and a second device, which perform a power transmission or a signal transmission through the electromagnetic coupling of coils which are arranged in mutually facing positions in the respective devices, wherein the ratio of (the outer diameter of the first coil)/(the outer diameter of the second coil) is equal to or greater than 0.7, and equal to or smaller than 1.3, and wherein one of the inner diameter of the first coil arranged in the first device and the inner diameter of the second coil arranged in the second device is larger than the other of the inner diameter of the first coil and the inner diameter of the second coil by at least 1 mm.

In yet another embodiment of the present invention, an electronic apparatus includes a first device and a second device, which perform a power transmission or a signal transmission through the electromagnetic coupling of coils which are arranged in mutually facing positions in the respective devices, wherein each of the ratios of (the inner diameter)/(the outer diameter) of the first coil and the second coil is equal to or greater than 0.3, and equal to or smaller than 0.7, and the ratio of (the outer diameter of the first coil)/(the outer diameter of the second coil) is equal to or greater than 0.7, and equal to or smaller than 1.3, and wherein one of the inner diameter of the first coil arranged in the first device and the inner diameter of the second coil arranged in the second device is larger than the other of the inner diameter of the first coil and the inner diameter of the second coil by at least 1 mm.

In yet another arrangement of the present invention, an electronic apparatus includes a charging device and a charged device, wherein the charging device, at least, includes a first coil arranged in a position facing the charged device and a charging circuit for supplying a signal to the first coil; wherein the charged device, at least, includes a second coil arranged in a position facing the charging device, a rectifier circuit for rectifying a signal induced in the second coil, and a storage circuit for performing charging based on a signal rectified by the rectifying means; and wherein each of the ratios of (the inner diameter)/(the outer diameter) of the first coil and the second coil is equal to or greater than 0.3, and equal to or smaller than 0.7, the ratio of (the outer diameter of the first coil)/(the outer diameter of the second coil) is equal to or greater than 0.7, and equal to or smaller than 1.3, and one of the inner diameter of the first coil and the inner diameter of the second coil is larger than the other of the inner diameter of the first coil and the inner diameter of the second coil by at least 1 mm.

In yet another arrangement of the present invention, an electronic apparatus includes a first device and a second device, wherein the first device, at least, includes a first coil arranged in a position facing the second device, and a receiver circuit for receiving a signal induced in the first coil; wherein the second device, at least, includes a second coil arranged in a position facing the first device, and a transmitter circuit for supplying the second coil with a signal to be transmitted to the first device; and wherein each of the ratios of (the inner diameter)/(the outer diameter) of the first coil and the second coil is equal to or greater than 0.3, and equal to or smaller than 0.7, the ratio of (the outer diameter of the first coil)/(the outer diameter of the second coil) is equal to or greater than 0.7, and equal to or smaller than 1.3, and one of the inner diameter of the first coil and the inner diameter of the second coil is larger than the other of the inner diameter of the first coil and the inner diameter of the second coil by at least 1 mm.

The present invention is made in view of the above problem and the object of the above arrangements is to provide an electronic apparatus which is less affected by the displacement between coils mounted in mutually facing positions in at least two separates devices, such as a portable electronic device and a station, when the devices perform a signal transmission or a power transmission through the electromagnetic coupling of the coils.

The other embodiment of the invention in this application provides the following apparatuses to achieve the first and second objects.

FIG. 12 is an explanatory view illustrating the principle of the other embodiment of the invention. To achieve the objects of the present invention, the electronic apparatus for performing a non-contact charging includes a charging unit 1 and a charged unit 2 separated from the charging unit 1. The charging unit 1 includes a primary coil 3 and an oscillator circuit (high-frequency oscillation circuit) 4, and the charged unit 2 includes a secondary coil 5 which is electromagnetically coupled with the primary coil 3 in the oscillator circuit, inducing a voltage therein, during the charging operation, and a secondary battery 6 which is charged by the voltage induced in the secondary coil 5. A transmitter-side cover glass 7 is arranged on the portion of the primary coil 3 in the charging unit 1, facing the charged unit 2, 6 and a receiver-side cover glass 8 is arranged on the portion of the secondary coil 5 in the charged unit 2, facing the charging unit 1.

The inner surfaces of the transmitter-side cover glass 7 and the receiver-side cover glass 8 are respectively coated with a deposited surface 9 and a deposited surface 10 to improve the appearance of the electronic apparatus. The same advantage may be enjoyed if the deposited surface is replaced with a plated surface, a printed surface, a painted surface, or a foiled surface. Alternatively, the cover glass may be a glass colored with a pigment, providing the same advantage.

When the charging operation is performed on the secondary battery 6 in the above-described arrangement, the power is fed to the charging unit with the charged unit placed on the charging unit. During the charging operation, the primary coil 3 and the secondary coil 5 are arranged to face each other, and these coils function as those of a single transformer. In other words, the primary coil 3 functions as a primary winding of the transformer, and the secondary coil 5 functions as a secondary winding of the transformer.

When the oscillator circuit 4 in the charging unit oscillates at a predetermined frequency during the charging operation, the transmitter-side coil 3 is electromagnetically coupled with the receiver-side coil 5, and the magnetic flux, generated in the transmitter-side coil 3, intersects the receiver-side coil 5, causing a voltage to be induced in the receiver-side coil 5.

The induced voltage charges the secondary battery 6.

As already described above, the transmitter-side cover glass 7 is arranged in the portion of the primary coil 3 facing the charged unit 3, and the receiver-side cover glass 8 is arranged in the portion of the secondary coil 5 in the charged unit 2 facing the charging unit 1. With this arrangement, the transmission efficiency is not degraded, an excess current is flown to the secondary coil 6 for a short duration of time, and an efficient quick charge thus becomes possible.

BRIEF DESCRIPTION OF THE DRAWINGS

FIG. 1 is a plan view showing the construction of a station and an electronic watch, according to a first embodiment.

FIG. 2 is a sectional view showing the construction of the station and the electronic watch.

FIG. 3 is a sectional view showing the construction of coils of the station and the electronic watch.

FIG. 4 is a block diagram showing the electrical arrangement of the station and the electrical watch.

FIG. 5 is a timing diagram showing the operation of the station and the electronic watch.

FIG. 6 is a circuit diagram showing one example of a receiver circuit of the station.

FIG. 7 is a timing diagram showing the operation of the receiver circuit.

FIG. 8 shows the result of a simulation of the characteristics of the ratio of an inner diameter/an outer diameter of each of a primary coil and a secondary coil and mutual conductance, when the primary and secondary coils are identical.

FIG. 9 shows the result of a simulation of the characteristics of the ratio of the outer diameter of the primary coil and the outer diameter of the secondary coil, maximum efficiency value, and minimum loss Wcmin.

FIG. 10 shows the result of a simulation of the distribution of a magnetic flux density depending on whether the primary coil and the secondary coil are in alignment or displaced from each other, and depending on whether the inner diameters of the two coils are equal or not.

FIG. 11 shows the measurement result of the effect of a displacement between the primary coil and the secondary coil.

FIG. 12 is an explanatory view illustrating the principle of a second embodiment.

FIG. 13 is an explanatory view of a motorized tooth brush of the second embodiment.

FIG. 14 shows measured data 1 in the second embodiment.

FIG. 15 shows measured data 2 in the second embodiment.

FIG. 16 is an explanatory view showing an electronic watch of a third embodiment.

FIG. 17 is an explanatory view of a conventional art.

BEST MODE FOR CARRYING OUT THE INVENTION

A. First Embodiment

A first embodiment of the present invention is now discussed. This embodiment relates to a station as a charging unit and an electronic watch as a charged unit, but the present invention is not limited to these.

<Mechanical construction>

FIG. 1 is a plan view showing the construction of the station and the electronic watch according to this embodiment. As shown, an electronic watch 200 is seated in a socket 101 of a station 100 when a charging operation or a data transmission operation is performed. Since the socket 101 is shaped to be slightly larger than a body 201 of and a band 202 of the electronic watch 200, the watch body 201 is seated in alignment in the station 100.

The station 100 is provided with an input section 103 through which a start command for charging is input and a display section 104 for presenting various displays. The electronic watch 200 of this embodiment is fastened to one wrist of a user in a normal operational state to display date, time, etc., on the display section 204. In addition, the electronic watch 200 detects biological information including the pulse rate or the heart rate of the body through an unshown sensor and stores it.

FIG. 2 is a sectional view shown in FIG. 1, taken along line A—A. As shown, a watch-side coil 210 for the data transmission and the battery charging is arranged in a case back 212 of the watch body 201 and is covered with a cover glass 211. The watch body 201 includes a circuit board 221, connected to a secondary battery 220 and a watch-side coil 210.

A station-side coil 110 is arranged in the portion of the socket 101 of the station 100, facing the watch-side coil 210, and is covered with a cover glass 111. The station 100 includes a circuit board 121, to which the station-side coil 110, the input section 103, the display section 104, and a primary power source (unshown) are connected. The station-side coil 110 and the watch-side coil 210 will be detailed later.

When the electronic watch 200 is placed onto the station 100, the station-side coil 110 and the watch-side coil 210 are physically out of contact with each other, but magnetically coupled with each other because the surfaces of coil winding of both coils are generally in parallel to each other.

The station-side coil 110 and the watch-side coil 210 are of a air-core type without any core, to limit the magnetization of a watch mechanism, to avoid an increase in the weight of the watch, and to prevent the exposure of a magnetic metal. When the present invention is applied to an electronic apparatus in which these concerns are not important, a coil having a core can be used. If the frequency of a signal fed to the coil is sufficiently high, an air-core type is perfectly acceptable.

The inventors of this invention disclosed in this application have conducted various simulation tests for the characteristics of coils. The results of the simulations are now discussed.

FIG. 8(b) shows the result of the simulation of the characteristics of mutual conductance M of the coils when the ratio of the inner/outer diameters (Din/Dout) is changed by changing the winding size as shown in FIG. 8(a), wherein the primary coil and the secondary coil are identically wound using a wire of the same length (3 m). As shown, mutual conductance M is high when the inner/outer diameter ratio is within a range of 0.3~0.7, and reaches its peak at a ratio of 0.5.

FIG. 9(b) shows the result of the simulation of the characteristics of maximum efficiency ηmax and minimum loss Wcmin in the transmission of 20 W, when the outer diameter ratio (D1/D2) of the two coils is changed as shown in FIG. 9(a), wherein the sum of the wire lengths of the primary coil and the secondary coil is constant (6 m). As shown, the outer diameter ratio of the primary coil and the secondary coil is within a range of 0.7~1.3, ηmax is high while Wcmin is low. When the outer diameter ratio of the primary coil and the secondary coil is 1.0 i.e., when the outer diameters of the primary coil and the secondary coil are equal, ηmax is at a maximum while Wcmin is at a minimum.

The inventors of this invention disclosed in this application simulated how the distribution of the magnetic flux density changed depending on whether the two-dimensional centers of the two coils were in alignment with each other or displaced from each other, and depending on whether the inner diameter of the primary coil was equal to, or was set to be larger, by 1 mm, than, the inner diameter of the secondary coil. The result is shown in FIG. 10. As shown, when the two coils having an equal inner diameter are displaced from each other, the range resulting in a high magnetic flux density is narrowed. In contrast, when the two coils having different inner diameters are displaced from each other, the range resulting in a high magnetic flux density remains almost the same as long as the displacement between the two coils is limited to within the inner diameter difference (1 mm).

The simulation result is supported by the next test. Specifically, the inventors of this invention disclosed in this application measured how the current picked up in the secondary coil changed depending on whether the two-dimensional centers of the two coils were in alignment with each other or displaced from each other, when the inner diameter of the primary coil was equal to, or was set to be larger, by 1 mm, than, the inner diameter of the secondary coil. The measurement result is shown in FIG. 11. As shown, the abscissa represents the displacement (mm) between the centers of the two coils while the ordinate represents a value relative to the current that is "1" when the displacement is zero. As shown, when the two coils have the same inner diameter, the current value of the secondary coil decreases as the displacement increases. When the two coils have the different inner diameters, the current value of the secondary coil does not change very much as long as the displacement is kept to within the inner diameter difference (1 mm).

Referring to FIG. 3, in this embodiment, the inner diameter of the station-side coil 110 is set to be larger than the inner diameter of the watch-side coil 210 by 1 mm so that the effect of the displacement is minimized with the displacement kept to within the inner diameter difference. In each of the station-side coil 110, as the primary coil, and the watch-side coil 210, as the secondary coil, the inner diameter is set to be about half the outer diameter, and their diameters are set to be substantially equal to each other. The efficiencies of the battery charging and the signal transmission are thus improved.

Considering the mounting accuracy of each coil and the mounting accuracy of the electronic watch 200 into the station 100, the inner diameter difference between the two coils is preferably set to be equal to or larger than the value in this embodiment, namely, equal to or larger than 1 mm.

<Electrical construction>

Next, the electrical construction of the station 100 and the electronic watch 200 is now discussed, referring to FIG. 4.

The station 100 is now discussed. Referring to FIG. 4, an oscillator circuit 140 outputs a clock signal CLK for synchronizing the operation of each block. When the user operates the input section 103 for starting the charging operation, the input section 103 feeds a one-shot pulse STR to a counter 150. The counter 150 is a circuit for controlling the connection of the coil in the station 100. Upon receiving the pulse STR, the counter 150 starts down-counting a preset value n in accordance with the clock signal CLK, and outputs an H-level signal T during the counting operation. In other words, the output signal T of the counter 150 remains at an H level for a constant duration of time from the start of the charging operation until n periods of the clock signal CLK elapse. The signal T is input to one input of an AND gate 152.

One terminal of the station-side coil 110 is pulled up to a power source voltage Vcc, while the other terminal D is connected to a drain of a transistor 153. A gate of the transistor 153 is connected to an output of the AND gate 153, the other input of which receives the clock signal CLK, and a source of the transistor 153 is grounded.

When the output signal T of the counter 150 is at an H level, the clock signal CLK directly becomes an output signal S1 of the AND gate 152, and in response to the level of the output signal S, the drain-source of the transistor 153 is switched.

The signal S2 at the terminal D of the station-side coil 110 is fed to a receiver circuit 154. The receiver circuit 154 demodulates the signal S2 in accordance with the clock signal CLK, and outputs a signal S3 as a demodulated result. The construction of the receiver circuit 154 will be described later. A processing circuit 155 is a circuit for performing a process in accordance with the demodulated signal S3, and in this embodiment, the processed result is displayed on the display section 104.

The electronic watch 200 is now discussed. One terminal of the watch-side coil 210 is connected to a positive terminal of the secondary battery 220 via a diode 245, while the other terminal of the watch-side coil 210 is connected to a negative terminal of the secondary battery 220. A voltage Vcc of the secondary battery 220 serves as a power source voltage for each block in the electronic watch 200.

A control circuit 230 has a timing function, causing a display section 204 to present time information. When a signal W1 is not induced, the control circuit 230 feeds a transmitter circuit 250 with digital data W2 to be transmitted to the station 100. The data to be transmitted to the station 100 may be biological information of the body, such as the pulse rate or heart rate, measured by an unshown sensor.

The transmitter circuit 250 serializes the data to be transmitted to the station 100, and outputs a switching signal, which is a burst of a fixed frequency signal, during an L level period of the serial data. The switching signal of the transmitter circuit 250 is fed to a base of a transistor 252 via a resistor 251. A collector of the transistor is connected to the positive terminal of the secondary battery 220 while an emitter of the transistor is connected to the one terminal of the watch-side coil 210.

When the signal W2 is induced in the watch-side coil 210, the signal W2 is half-wave-rectified, charging the secondary battery. When the signal W2 is not induced, the switching signal in response to the data to be transmitted to the station 100 is fed to the watch-side coil 210.

The construction of the receiver circuit 154 in the station 100 is discussed, referring to FIG. 6. The construction shown is one example, only, and may be determined by the modulation method employed in the transmitter circuit 250 in the electronic watch 200.

A signal induced at the other terminal D of the station-side coil 110 is inverted in level and wave-shaped by an inverter circuit 1541 as shown in FIG. 6, and is supplied, as a reset signal RST, to D-flipflops 1542 and 1543 which are synchronized with the clock signal CLK of the oscillator circuit 140 (as shown in FIG. 4). The input terminal D of the D-flipflop 1542 is connected to the power source voltage Vcc while an output terminal Q of the D-flipflop 1542 is connected to an input terminal D of the next stage D-flipflop 1543. An output terminal Q of the D-flipflop 1543 outputs the signal S3 as the demodulated output.

Waveforms at points in the receiver circuit 154 thus constructed are now discussed.

When the data is received from the electronic watch 200, the transistor 153 (see FIG. 4) is not switched on. The other terminal D of the station-side coil 110 remains pulled up when no external magnetic field is established by the watch-side coil 210. When an external magnetic field is established, the other terminal D of the station-side coil 110 varies in level in accordance with the induced voltage. The signal S2 induced at the terminal D looks something like the one shown in FIG. 7(a).

As shown in FIG. 7(b), the signal RST, which is the output of the inverter circuit 1541, is driven high when the voltage of the signal S2 drops below a threshold Vth. The signal RST resets D-flipflops 1542 and 1543. Since the D-flipflops 1542 and 1543 output, at a rising edge of the clock signal CLK, the level of the input terminal D immediately prior to the rising edge of the clock signal CLK, the output Q1 of D-flipflop 1542 and the output S3 of D-flipflop 1543, respectively, look something like the ones shown in FIGS. 7(d) and 7(e). The output signal S3 of the receiver circuit 154 remains at an L level for a duration during which the external magnetic field is generated by the watch-side coil 210.

Since the duration during which the external magnetic field is generated by the watch-side coil 210 means the duration during which the data transmitted from the electronic watch 200 to the station 100 remains at an L level, the signal S3 is the demodulated version of the data from the electronic watch 200.

<Operation>

Discussed now are the charging operation and the data transmission operation by the station 100 and the electronic watch according to this embodiment.

The user places the electronic watch 200 into the socket 101 of the station 100. Since the station-side coil 110 and the watch-side coil 210 face each other as shown in FIG. 2 and FIG. 3, both coils are electromagnetically coupled.

When the user operates the input section 103 in the station 100 to start the charging operation, the one-shot pulse STR is output from the input section 103 at timing t1 as shown in FIG. 5(a). The counter 150 starts a down-counting operation, driving the signal T to an H level as shown in FIG. 5(b).

When the signal T is transitioned to an H level, the AND gate 152 is opened, thereby causing the transistor 153 to switch itself in accordance with the clock signal CLK. Since the transistor 153 switches itself in accordance with the waveform shown in FIG. 5(c), the station-side coil 110 is supplied with a pulse signal which is a power source voltage Vcc pulsed in accordance with the clock signal CLK. In this way, the external magnetic field is generated.

In response to the external magnetic field, the signal W1, having the same period as that of the pulse signal, is induced in the watch-side coil 210. The induced signal is half-wave rectified, and then charges the secondary battery 220.

At the moment the output of the counter 150, which down-counts the preset value n in response to the clock signal CLK, becomes zero at timing t2 shown in FIG. 5(b), the signal T is driven to an L level.

With the signal T driven to an L level, the AND gate 152 is closed, thereby keeping the transistor 153 turned off regardless of the clock signal CLK. No signal is thus induced in the watch-side coil 210.

The charging operation for the secondary battery 220 is thus completed. On the other hand, the control circuit 230 feeds the transmitter circuit 250 with the digital data W2 to be transmitted to the station 100, thereby starting the signal transmission from the electronic watch 200 to the station 100.

If the data to be transmitted to the station 100 looks something like the one shown in FIG. 5(d), the switching signal of the transmitter circuit 250 is an H level signal when the data is at an H level, and is a pulse signal having a constant frequency in a burst when the data is at an L level. The transistor 252 is switched in accordance with the waveform shown in FIG. 5(e).

The watch-side coil 210 is supplied with the pulse signal, when the data to be transmitted to the station 100 is at an L level, and the external magnetic field is thus generated.

In response to the external magnetic field, the signal S2, having the same period as that of the pulse signal, is induced at the terminal D of the station-side coil 110. For the duration during which the signal is induced, the above-described receiver circuit 154 presents the signal S3 at an L level, and as a result, the station 100 receives the signal S3 demodulated from the digital data W2 from the electronic watch 200, from timing t2 thereafter. In the station 100, the processing circuit 155 performs the process in accordance with the demodulated signal S3, and the process result is presented on the display section 104.

In this embodiment, the inner diameter of the station-side coil 110 is larger than the inner diameter of the watch-side coil 210 by 1 mm, and even if the centers of the two coils are displaced from each other, the efficiency in the power transmission and the efficiency in the signal are not reduced so much. In each of the station-side coil 110 and the watch-side coil 210, the inner diameter is about half as large as the outer diameter, and the outer diameters of the two coils are approximately equal, and the efficiency in the charging and the efficiency in the signal transmission are high.

In this embodiment, the power transmission or the signal transmission, when performed through the magnetic coupling of the two coils, is less susceptible to the displacement between the two coils, and the efficiency in the data transmission and the efficiency in the power transmission are maintained.

In this embodiment, the secondary battery 220 in the electronic watch 200 is charged from timing t1 to timing t2 in response to the external magnetic field generated, and the data transmission is carried out from timing t2 thereafter. This arrangement precludes the possibility that an insufficient voltage in the secondary battery 220 in the electronic watch 200 is the reason for a failure to perform the data transmission.

<Modifications>

The following modifications may be made from the above embodiment.

In the above embodiment, to serve the two purposes of reducing the effect of the displacement between the two coils and of maintaining the efficiencies in the data transmission and the power transmission, the inner diameter of the station-side coil 110 is set to be larger than the inner diameter of the watch-side coil 210 by 1 mm, the inner diameter is set to be half as large as the outer diameter in each coil, and the two outer diameters of the two coils are set to be approximately equal to each other. Satisfying all of these conditions at the same time is not a requirement.

Specifically, it will be sufficient to set the inner diameter of the station-side coil 110 to be larger than the inner diameter of the watch-side coil 210 by 1 mm and to set the inner diameter to be half as large as the outer diameter in each coil. Alternatively, it will be sufficient to set the inner diameter of the station-side coil 110 to be larger than the inner diameter of the watch-side coil 210 by 1 mm and to set the outer diameters of the two coils to be approximately equal to each other.

From the standpoint of maintaining the efficiencies in the data and power transmissions, setting the inner diameter to be half as large as the outer diameter in each coil is not a requirement, and setting the outer diameters of the two coils to be approximately equal to each other is not a requirement, either. Referring to FIG. 8(b), each of the inner/outer diameter ratios of the station-side coil 110 and the watch-side coil 210 is preferably within a range of 0.3~0.7, and referring to FIG. 9(b), the ratio of the outer diameter of the station-side coil 110/the outer diameter of the watch-side coil 210 is preferably within a range of 0.7~1.3.

In the above embodiment, the data transmission is one-way from the electronic watch 200 to the station 100, but the data transmission may be performed from the station 100 to the electronic watch 200. To transmit data to the electronic watch 200, the station 100 may perform modulation in accordance with the data to be transmitted, while the electronic watch 200 may perform demodulation according to the modulation method. The modulation and the demodulation may be one of the known techniques.

In the above embodiment, the inner diameter of the station-side coil 110 is set to be larger than the inner diameter of the watch-side coil 210. Conversely, the inner diameter of the watch-side coil 210 may be set to be larger than the inner diameter of the station-side coil 110.

The above embodiment has been discussed in connection with the station 100 as the charging device and the electronic watch 200 as the charged device. In the context of the present invention disclosed in this application, however, the discrimination between these devices and the discrimination between the first device and the second device, are meaningless, and the present invention is applied to any electronic apparatus that performs the power transmission or the signal transmission. For example, the present invention finds applications in a charged device including a secondary battery, such as a motorized tooth brush, a motorized shaver, a cordless telephone, a portable telephone, a personal handy phone, a mobile personal computer, or a PDA (Personal Digital Assistants: personal information terminal), and a charging device. Furthermore, the present invention may be applied to any electronic apparatus having at least two separated devices.

B. Second Embodiment

A second embodiment of the present invention is now discussed, referring to drawings. In the embodiment discussed below, the present invention is applied to a non-contact rechargeable type motorized tooth brush.

FIG. 13(a) is an explanatory view of a motorized tooth brush of the embodiment of the present invention. FIG. 13(b) is an enlarged view of a portion of the tooth brush shown in FIG. 13(a).

There are shown a stand 11, a charging stand housing 12, a motorized tooth brush 13, a motorized tooth brush housing 14, a transmitter-side printed board 15, a transmitter-side coil 16, a receiver-side printed board 17, a receiver-side coil 18, a secondary battery 19, a motorized tooth brush seat 20, a transmitter-side cover glass 22, a transmitter-side cover glass deposited surface 23, a receiver-side cover glass 24, and a receiver-side cover glass deposited surface 25.

The non-contact rechargeable type motorized tooth brush includes the motorized tooth brush 13 and the charging stand 11. The charging stand 11 is provided with a charging unit, and the motorized tooth brush 13 is provided with a charged unit.

The charging stand 11 includes the charging stand housing 12 and the charging unit is arranged in the charging stand housing 12. The motorized tooth brush 13 includes the motorized tooth brush housing 14, and the charged unit is arranged in the motorized tooth brush housing 14.

The charging stand housing 12 includes the motorized tooth brush seat 20 for mounting the motorized tooth brush 13 thereon. When the motorized tooth brush 13 is in use, the user picks up the motorized tooth brush 13 from the motorized tooth brush seat 20, and at other times, the motorized tooth brush 13 is placed onto the motorized tooth brush seat 20 to charge itself in a non-contact fashion.

The charging unit arranged in the charging stand housing 12 includes circuit components for a high-frequency oscillator circuit, and these components are mounted on the transmitter-side printed board 15. The transmitter-side coil 16, out of these components, is mounted on the transmitter printed board.

The transmitter-side coil 16 is arranged in a position facing and closest to the motorized tooth brush seat 20.

The transmitter-side cover glass 22 is arranged between the transmitter-side coil 16 on the charging stand housing 12 and the receiver-side coil 18, two-dimensionally covering the transmitter-side coil 16 or the receiver-side coil 18. The transmitter-side cover glass 22 may be glued onto the charging stand housing 12 using an ultraviolet curing adhesive, for example.

The receiver-side cover glass deposited surface 23 is formed on the transmitter-side cover glass 22 on its surface facing the transmitter-side coil 16.

The charged unit arranged in the motorized tooth brush housing 14 includes circuit components for a charging circuit or the like, and these circuit components are mounted on the receiver-side printed board 17. The receiver-side coil 18, out of the circuit components, is mounted on the receiver-side printed board 17.

The receiver-side coil 18 is arranged in the motorized tooth brush 13 so that the receiver-side coil 18 comes closest to the motorized tooth brush seat 20 and is aligned to face the transmitter-side coil 16, when the motorized tooth brush 13 is placed onto the motorized tooth brush seat 20.

The receiver-side cover glass 24 is arranged between the receiver-side coil 18 in the motorized tooth brush housing 14 and the transmitter-side coil 16, two-dimensionally covering the receiver-side coil 18 or the transmitter-side coil 16. The receiver-side cover glass 24 may be glued onto the motorized tooth brush housing 14 using an ultraviolet curing adhesive, for example.

The receiver-side cover glass deposited surface 25 is formed on the receiver side cover glass 24 on its surface facing the receiver-side coil 18.

The secondary battery 19 is positioned far from the motorized tooth brush seat 20, when motorized tooth brush 13 is placed onto the motorized tooth brush seat 20.

Usable as the secondary battery is a nickel-cadmium battery, a nickel-hydrogen battery, a lithium-ion battery or the like.

Referring to FIG. 13(b), the thicknesses of the charging stand housing 12 and the motorized tooth brush housing 14 are present between the receiver-side coil 18 and the transmitter-side coil 16 during the charging operation.

FIG. 14 shows measured data of the thickness and transmission efficiency. In the measured data plotted in FIG. 14, the abscissa represents the distance d (mm), viewed in cross section, between the edge of the outer circumference of the transmitter-side coil and the edge of the outer circumference of the receiver-side coil, while the ordinate represents how many times a relative transmission efficiency is referenced to the transmission efficiency as a 1 when there is a distance d of 5 mm, viewed in cross section, between the edge of the outer circumference of the transmitter-side coil and the edge of the outer circumference of the receiver-side coil.

As seen from FIG. 14, as the sectional distance d decreases, the transmission efficiency increases in accordance with a quadric curve, and the system thus permits a high-efficiency transmission.

At a distance of 3 mm or less, the transmission efficiency is approximately 100 times the one in the conventional art having a distance of 5 mm. The apparatus thus presents a high transmission efficiency, thereby serving the purpose of quick charging.

To limit the distance between the two coils to 3 mm and to result in a waterproof structure that withstands a water pressure of five atmospheres, the housings need to be constructed of a high-rigidity material such as a metal. If a conductive member is used for the housings between the transmitter-side coil and the receiver-side coil in the power transmission system that works on electromagnetic induction, eddy currents occur in the conductive member, impeding the transmission, and the use of the conductive member is not appropriate for a high-efficiency transmission.

FIG. 15 shows measured data of housing materials and transmission efficiencies. The measured data shown in FIG. 15 is the measurement result of transmission efficiencies that were measured with a distance d of 3 mm, in cross section, allowed between the edge of outer circumference of the transmitter-side coil and the outer circumference of the receiver-side coil, and the housing materials inserted between the two coils. The abscissa represents the materials used for external housings, the thickness of each material, and surface process means, while the ordinate represents relative transmission efficiency (%), referenced to a transmission efficiency of 100% with a stainless product having a thickness of 1 mm inserted between the coils.

Referring to the data shown in FIG. 15, the use of an insulating material for the external housing results in a transmission efficiency ten times as high as the one achieved by a stainless product.

It is also learned that even if one side of an insulating material is coated with a one-$\mu$m thick deposit of metal, such as of aluminum, any degradation attributed to eddy currents does not take place.

Since the glass member is typically transparent, the internal coil and electronic components are seen through from the outside. This is not preferred from the aesthetic point of view. Furthermore, the electronic components are subject to deterioration by light, particularly by ultraviolet lights. To resolve these problems, a deposited surface is employed on the inner surface of the glass member. Instead of the deposited surface, the inner surface of the glass member may be coated with a plated surface, a printed surface, or foiled surface, or the glass member itself may be a glass colored with a pigment.

C. Third Embodiment

FIG. 16 shows the principle of a third embodiment of the present invention. The embodiment to be discussed below is an electronic watch having a non-contact type data transmission device.

FIG. 16(a) shows the construction of the electronic watch of the present invention, in which a data transmission device 31 and an electronic watch 35 are included.

FIG. 16(b) is a sectional view of the electronic watch of the present invention, in which there are shown the data transmission device 31, a transmitter-side coil 32, a transmitter-side cover glass 33, a transmitter circuit board 34, the electronic watch 35, an electronic-watch-side coil 36, an electronic watch case back 37, an electronic watch case back cover glass 38, a secondary battery 39, and an electronic watch circuit 40.

FIG. 16(c) is a block diagram of the electronic watch of the present invention.

The non-contact, data transmission type electronic watch of this embodiment includes the data transmission device 31 and the electronic watch 35. The data transmission device 31 includes a data transmitter unit while the electronic watch includes a data receiver unit.

The data transmission device 31 includes an electronic watch seat on which the electronic watch 35 is placed. When data is transmitted to the electronic watch, the electronic watch 35 is placed on the electronic watch seat of the data transmission device 31.

The data transmitter unit arranged in the data transmission device 31 has circuit components including a signal generator circuit 41, a modulator circuit 42, the driver circuit 43, the transmitter-side coil 32, a setting circuit 44, a detector circuit 45, etc, and these circuit components are mounted on the transmitter circuit board 34. The transmitter-side coil 32 is arranged in a position facing and closest to the electronic watch seat. The transmitter-side cover glass 33 is arranged on the electronic watch seat in the data transmission device 31, and between the transmitter-side coil 32 and the electronic-watch-side coil 36, two-dimensionally covering the transmitter-side coil 32 and the electronic-watch-side coil 36.

The data receiver unit in the electronic watch 35 includes circuit components such as the electronic-watch-side coil 36 and a demodulator circuit 46. These circuit components are mounted on the electronic watch circuit 40, along with a motor drive circuit 47, a step motor 48, and a hand 49 of the electronic watch. The electronic-watch-side coil 36 is arranged in a position facing and closest to the electronic watch seat, when the electronic watch 35 is placed on the electronic watch seat of the data transmission device 31. The electronic watch case back cover glass 38 is arranged, on the electronic watch case back 37 of the electronic watch 35, and between the transmitter-side coil 32 and the electronic-watch-side coil 36, two-dimensionally covering the transmitter-side coil 32 and the electronic-watch-side coil 36.

The secondary battery 39 is positioned far from the electronic watch seat, when the electronic watch 35 is placed on the electronic watch seat of the data transmission device 31.

As one example of data transmission, the operation of setting the electronic watch is discussed, referring to FIG. 16(b) and FIG. 16(c).

When time data required to watch setting is input in the data transmission device 31, the setting circuit 44 starts operating, the detector circuit 45 detects the set state, and operates the modulator circuit 42 in accordance with the detected information. Designated 41 is the signal generator circuit, and the modulator circuit 42 performs modulation in accordance with the output signal from the signal generator circuit 41. In response to the output from the modulator circuit 42, the driver circuit 43 drives the transmitter-side coil 32. A modulated signal is output from the transmitter-side coil 32, and is transmitted, in the form of changing magnetic field, to the electronic-watch-side coil 36 such as an analog wristwatch. Through magnetic induction, a voltage is induced in the electronic-watch-side coil 36, and a pulse width of the received signal is detected by the demodulator circuit 46, and based on the pulse width, the motor drive circuit 47 is controlled so that the step motor 48 rotates in a normal or reverse direction, or stops. In this way, the hand 49 rotates for time setting.

When the data transmission is performed from the transmitter-side coil 32 to the electronic-watch-side coil 36 through the electromagnetic induction, the use of the construction provided by the present invention improves the transmission efficiency, and permits a high S/N ratio data transmission at a low power.

As described above, the second and third embodiments have the following advantages.

(1) In an electronic apparatus including separated electronic devices, each having at least one coil in a position mutually facing the other device, for performing a signal transmission or a power transmission in a non-contact fashion through electromagnetic induction or electromagnetic coupling therebetween, the power transmission efficiency from the charging unit to the charged unit is improved by arranging a glass member on an external surface of at least one of the coils, facing the other coil, and a quick charging of the secondary battery is thus enabled. A high S/N ratio signal transmission is also performed at a low power.

(2) By arranging a high-rigidity glass on the surface to which the primary coil and the secondary coil face, a compact and waterproof electronic apparatus is provided.

(3) Although a portion, to which the glass member is attached (for example, the electronic watch case back 37 in FIG. 13) is constructed of a metal in the abovereferenced second and third embodiments, constructing only the portion supporting the glass member (for example, the periphery of the glass member) of the metal member is sufficient.

D. Modifications (1) In the first embodiment, the case back 212 (typically made of a metal) and the cover glass 211 are arranged as shown in FIG. 2, and the station-side coil 110 is arranged in a position facing the watch-side coil 210, and is also supported by the cover glass 111.

Specifically, a combination of the insulating material and the metal material is attached to the external portion of the watch-side coil 210 (one coil) facing the station-side coil 110 (the other coil), and the advantage of the second and third embodiments is thus additionally provided.

It is possible to combine the technique of setting the inner diameter of one of the first and second coil to be larger than the inner diameter of the other of the first and second coil by 1 mm with the technique of arranging an insulating body (glass, for example) on the surface where the first and second coils face each other, and such a combination offers the following advantages.

By arranging the insulating body in the portion where the coils face, compact design is promoted to some degree in the apparatus while waterproofness and rigidity are maintained. Since a displacement, if any, between the coils affects the electromagnetic coupling, a high assembly accuracy is required and an alignment mechanism for use in the charging/communication is also required. By setting the inner diameter of one coil to be larger than the inner diameter of the other coil by 1 mm, these inconveniences are eliminated. No such rigorous assembly accuracy is required, and simple design is promoted in the electronic apparatus, and thus ease of assembly is assured. A compact design is also implemented. Even with a modest degree of displacement, the power transmission is reliably performed at a high efficiency. Thus, a low transmitted power works during the charging/communication.

In the first embodiment, the cover glasses 211 and 111 may be replaced with other insulating materials, or even a metal may be used instead. With a metal used, the efficiency in the magnetic coupling drops, but when the magnetic coupling efficiency is not a concern, the use of a metal is possible. Even when the metal is used, the advantage resulting from setting the inner diameter of one coil to be larger than the inner diameter of the other coil remains unchanged from that in the first embodiment.

(2) In the second and third embodiments, the inner diameter of one of the two coils, which are arranged to face each other during the charging and communication, may be set to be larger than the inner diameter of the other of the two coils @ by at least 1 mm. In this case, the advantage of the first embodiment is additionally enjoyed.

What is claimed is:

1. An electronic apparatus for performing a power or signal transmission between two devices, comprising:
   a first device having a first coil; and
   a second device having a second coil, the first and second coils being arranged in mutually facing positions;
   wherein an inner diameter of the first coil and an inner diameter of the second coil differ by at least 1 mm;
   wherein a ratio of the inner diameter of the first coil to an outer diameter of the first coil and a ratio of the inner diameter of the second coil to an outer diameter of the second coil are each greater than or equal to 0.3 and less than or equal to 0.7; and
   wherein power transmission or signal transmission between the first and second devices is accomplished through electromagnetic coupling of the first and second coils.

2. An electronic apparatus according to claim 1, wherein a ratio of an outer diameter of the first coil to an outer diameter of the second coil is greater than or equal to 0.7 and less than or equal to 1.3.

3. An electronic apparatus according to claim 1, wherein at least one of the first coil and the second coil is of an air-core type.

4. An electronic apparatus according to claim 1, wherein the inner diameter of the first coil is larger than the inner diameter of the second coil.

5. An electronic apparatus according to claim 1, wherein the second device is of a portable type.

6. An electronic apparatus according to claim 1, wherein a portion of at least one of the first and second devices, facing the coil of the other device, is formed of an insulating body.

7. An electronic apparatus according to claim 6, wherein the insulating body is attached to at least one of the first and second devices through a metal member.

8. An electronic apparatus comprising:
   a charging device and a charged device;

wherein the charging device comprises a first coil arranged in a position facing the charged device, and a charging circuit for supplying a signal to the first coil;

wherein the charged device comprises a second coil arranged in a position facing the charging device, a rectifier circuit for rectifying a signal induced in the second coil, and a storage circuit for performing charging based on a signal rectified by the rectifier circuit;

wherein an inner diameter of the first coil and an inner diameter of the second coil differ by at least 1 mm;

wherein a ratio of the inner diameter of the first coil to an outer diameter of the first coil and a ratio of the inner diameter of the second coil to an outer diameter of the second coil are each greater than or equal to 0.3 and less than or equal to 0.7; and wherein a ratio of the outer diameter of the first coil to the outer diameter of the second coil is greater than or equal to 0.7 and less than or equal to 1.3.

9. An electronic apparatus comprising:

a first device and a second device;

wherein the first device comprises a first coil arranged in a position facing the second device, and a receiver circuit for receiving a signal induced in the first coil;

wherein the second device comprises a second coil arranged in a position facing the first device, and a transmitter circuit for supplying the second coil with a signal to be transmitted to the first device;

wherein an inner diameter of the first coil and an inner diameter of the second coil differ by at least 1 mm;

wherein a ratio of the inner diameter of the first coil to an outer diameter of the first coil and a ratio of the inner diameter of the second coil to an outer diameter of the second coil are each greater than or equal to 0.3 and less than or equal to 0.7; and wherein a ratio of the outer diameter of the first coil to the outer diameter of the second coil is greater than or equal to 0.7 and less than or equal to 1.3.

10. An electronic apparatus comprising:

at least two separated electronic devices, each having at least one coil in a position mutually facing the coil of the other device, for performing a signal or power transmission in a non-contact fashion through electromagnetic induction or electromagnetic coupling between the coils of the separated devices; and a member formed of an insulating material and a metal and arranged so that the insulating material of the member is positioned on an external surface of at least one of the coils facing the other coil;

wherein a ratio of an inner diameter to an outer diameter of the at least one coil of one of the devices and a ratio of an inner diameter to an outer diameter of the at least one coil of another of the devices are each greater than or equal to 0.3 and less than or equal to 0.7.

11. An electronic apparatus according to claim 10, wherein the insulating material is glass.

12. An electronic apparatus according to claim 11, wherein the glass is opaque, colored glass or translucent, colored glass.

13. An electronic apparatus according to claim 11, wherein an inner surface of the glass is deposited, plated, printed, painted or foiled.

14. An electronic apparatus comprising:

at least two separated electronic devices, each having at least one coil in a position mutually facing the coil of the other device, for performing a signal or power transmission in a non-contact fashion through electromagnetic induction or electromagnetic coupling between the coils of the separated devices; and an insulating member arranged on an external surface of at least one of the coils facing the other coil;

wherein a ratio of an inner diameter to an outer diameter of the at least one coil of one of the devices and a ratio of an inner diameter to an outer diameter of the at least one coil of another of the devices are each greater than or equal to 0.3 and less than or equal to 0.7.

15. An electronic apparatus according to claim 14, wherein the insulating member is made of glass.

16. An electronic apparatus according to claim 15, wherein the glass is opaque, colored glass or translucent, colored glass.

17. An electronic apparatus according to claim 15, wherein an inner surface of the glass is deposited, plated, printed, painted or foiled.

* * * * *